(12) United States Patent
Raju et al.

(10) Patent No.: US 12,331,781 B2
(45) Date of Patent: Jun. 17, 2025

(54) DUAL THRUST BEARING SYSTEMS AND METHODS FOR OPERATING THE SAME

(71) Applicant: General Electric Company, Schenectady, NY (US)

(72) Inventors: Mohan Kannaiah Raju, Bengaluru (IN); David Raju Yamarthi, Bengaluru (IN); Santosh Kumar Pattnaik, Bengaluru (IN); Adam Joseph Wangler, Evendale, OH (US); Ravindra Shankar Ganiger, Bengaluru (IN); Sanjeev Sai Kumar Manepalli, Bengaluru (IN)

(73) Assignee: General Electric Company, Evendale, OH (US)

( * ) Notice: Subject to any disclaimer, the term of this patent is extended or adjusted under 35 U.S.C. 154(b) by 53 days.

(21) Appl. No.: 18/191,631

(22) Filed: Mar. 28, 2023

(65) Prior Publication Data

US 2024/0263671 A1    Aug. 8, 2024

(30) Foreign Application Priority Data

Feb. 3, 2023    (IN) .............................. 202311007068

(51) Int. Cl.
*F16C 17/04*    (2006.01)
*F04D 29/051*    (2006.01)
*F16C 17/26*    (2006.01)

(52) U.S. Cl.
CPC .......... *F16C 17/04* (2013.01); *F04D 29/0513* (2013.01); *F16C 17/045* (2013.01);
(Continued)

(58) Field of Classification Search
CPC ........ F16C 17/04; F16C 17/045; F16C 17/26; F16C 2360/00; F16C 2360/44; F04D 29/0413; F04D 29/0513
See application file for complete search history.

(56) References Cited

U.S. PATENT DOCUMENTS 1,845,789 A * 2/1932 Gilson .................... F16C 17/04
384/368
2,029,011 A    1/1936 Bart
(Continued)

FOREIGN PATENT DOCUMENTS

CA    3002246 A1    11/2018
CN    101939161 A    1/2011
(Continued)

OTHER PUBLICATIONS

United States Patent and Trademark Office, "Requirement for Restriction," issued in connection with U.S. Appl. No. 17/840,410, dated Aug. 24, 2023, 7 pages.
(Continued)

*Primary Examiner* — Phillip A Johnson
(74) *Attorney, Agent, or Firm* — Hanley, Flight & Zimmerman, LLC

(57) ABSTRACT

Example thrust bearing apparatus includes: a thrust disk extending radially from the shaft, the thrust disk having a first side and a second side opposite the first side; a bearing housing surrounding the thrust disk and the shaft, the bearing housing having a first wall facing the first side of the thrust disk and a second wall facing the second side of the thrust disk; a first thrust pad coupled to the first wall of the bearing housing, the first thrust pad including a first plurality of serrations circumferentially arranged in a first pattern along the first thrust pad; and a second thrust pad coupled to the first side of the thrust disk, the second thrust pad including a second plurality of serrations circumferentially arranged in a second pattern along the second thrust pad.

18 Claims, 10 Drawing Sheets

(52) U.S. Cl.
CPC .......... *F16C 17/26* (2013.01); *F16C 2360/00* (2013.01); *F16C 2360/44* (2013.01)

(56) References Cited

U.S. PATENT DOCUMENTS

| | | | |
|---|---|---|---|
| 2,556,854 A | 6/1951 | Spears | |
| 2,773,963 A | 12/1956 | Matthews | |
| 3,734,637 A | 5/1973 | Beck | |
| 3,913,989 A * | 10/1975 | Williams | F16C 32/0614 |
| | | | 384/123 |
| 3,951,573 A | 4/1976 | Dunning et al. | |
| 4,020,634 A | 5/1977 | Bradley | |
| 4,049,327 A * | 9/1977 | Goloff | F16C 23/04 |
| | | | 384/248 |
| 4,159,255 A | 6/1979 | Gainer | |
| 4,167,295 A | 9/1979 | Glaser | |
| 4,213,307 A | 7/1980 | Watson | |
| 4,288,128 A * | 9/1981 | Wells | F16C 23/04 |
| | | | 384/143 |
| 4,557,611 A * | 12/1985 | Sixsmith | F16C 32/0692 |
| | | | 384/124 |
| 4,752,194 A | 6/1988 | Wienen et al. | |
| 4,838,763 A | 6/1989 | Roland | |
| 4,844,707 A | 7/1989 | Kletschka | |
| 4,850,818 A | 7/1989 | Kotera | |
| 4,854,823 A | 8/1989 | Hatting | |
| 5,334,004 A | 8/1994 | Lefevre | |
| 5,857,348 A | 1/1999 | Conry | |
| 6,065,297 A | 5/2000 | Tischer | |
| 6,139,595 A | 10/2000 | Herman | |
| 6,213,736 B1 | 4/2001 | Weisser | |
| 6,293,772 B1 | 9/2001 | Brown et al. | |
| 6,371,651 B1 * | 4/2002 | Fujii | F16C 33/107 |
| | | | 384/121 |
| 6,461,260 B1 | 10/2002 | Higginbotham | |
| 6,948,853 B2 | 9/2005 | Agrawal | |
| 7,070,330 B2 | 7/2006 | Agrawal | |
| 7,249,939 B2 | 7/2007 | Yanagihara et al. | |
| 7,293,917 B2 | 11/2007 | Jang et al. | |
| 7,757,502 B2 | 7/2010 | Merritt et al. | |
| 7,948,105 B2 | 5/2011 | Agrawal et al. | |
| 8,764,417 B2 | 7/2014 | Kim | |
| 8,893,499 B2 | 11/2014 | Maier | |
| 9,617,999 B2 | 4/2017 | Schneider et al. | |
| 9,657,594 B2 | 5/2017 | Klusman | |
| 9,689,277 B2 | 6/2017 | Klusman | |
| 9,841,025 B2 | 12/2017 | Mischiatti et al. | |
| 9,964,113 B2 | 5/2018 | Westberg et al. | |
| 10,280,760 B2 | 5/2019 | Joshi et al. | |
| 10,371,156 B2 | 8/2019 | Colson et al. | |
| 10,385,915 B2 | 8/2019 | Himmelmann | |
| 10,428,822 B1 | 10/2019 | Wang et al. | |
| 10,774,874 B2 | 9/2020 | Binion et al. | |
| 10,883,422 B2 | 1/2021 | Boujida et al. | |
| 10,899,982 B2 | 1/2021 | Tian et al. | |
| 10,927,843 B2 | 2/2021 | Roach | |
| 10,982,713 B2 | 4/2021 | Ertas et al. | |
| 11,009,085 B2 | 5/2021 | Klemen et al. | |
| 11,015,534 B2 | 5/2021 | Smith et al. | |
| 11,384,764 B2 | 7/2022 | Stuart | |
| 11,396,907 B2 | 7/2022 | Ikeda et al. | |
| 11,891,998 B2 | 2/2024 | Yamarthi et al. | |
| 2007/0164626 A1 | 7/2007 | Taniguchi et al. | |
| 2011/0234035 A1 | 9/2011 | Wittschier | |
| 2011/0256389 A1 | 10/2011 | Dendis | |
| 2012/0167577 A1 | 7/2012 | Pemmi et al. | |
| 2016/0123328 A1 | 5/2016 | Drechsel | |
| 2016/0222968 A1 | 8/2016 | Clements | |
| 2016/0305433 A1 | 10/2016 | Eschner | |
| 2016/0356310 A1 | 12/2016 | Yoshino | |
| 2018/0320801 A1 | 11/2018 | Yang | |
| 2019/0058374 A1 | 2/2019 | Enomoto | |
| 2019/0331027 A1 | 10/2019 | Fairman | |
| 2020/0141324 A1 | 5/2020 | Nayak et al. | |
| 2021/0013759 A1 | 1/2021 | Torrey et al. | |
| 2021/0148283 A1 | 5/2021 | Niergarth et al. | |
| 2021/0164516 A1 * | 6/2021 | Hantz | F04D 19/02 |
| 2021/0246901 A1 | 8/2021 | Eschner | |
| 2021/0254547 A1 | 8/2021 | Deng | |
| 2021/0301720 A1 | 9/2021 | Staubach et al. | |
| 2021/0317729 A1 | 10/2021 | Sheth | |
| 2022/0154730 A1 | 5/2022 | Groeschel | |
| 2023/0358247 A1 | 11/2023 | Yamarthi et al. | |

FOREIGN PATENT DOCUMENTS

| | | | |
|---|---|---|---|
| CN | 203114905 U | 8/2013 | |
| CN | 105308326 A | 2/2016 | |
| CN | 105422474 A | 3/2016 | |
| CN | 205840927 U | 12/2016 | |
| CN | 205840927 U1 | 12/2016 | |
| CN | 107448246 A | 12/2017 | |
| CN | 112400065 A | 2/2021 | |
| CN | 114151377 A | 3/2022 | |
| DE | 3831457 A1 | 3/1990 | |
| DE | 29508668 U1 | 5/1995 | |
| DE | 202012006480 U1 | 8/2012 | |
| EP | 0268013 A2 | 5/1988 | |
| EP | 0704026 A1 | 4/1996 | |
| EP | 2687703 B1 | 1/2018 | |
| EP | 3771833 A1 | 2/2021 | |
| EP | 3805529 A1 | 4/2021 | |
| FR | 2672636 A1 | 8/1992 | |
| JP | 2006057505 A * | 3/2006 | F04D 19/042 |
| JP | 2014001642 A | 1/2014 | |
| JP | 2020033875 A | 3/2020 | |
| WO | 2012122963 A2 | 9/2012 | |
| WO | 2013157986 A1 | 10/2013 | |
| WO | 2014160257 A1 | 10/2014 | |
| WO | 2015035006 A2 | 3/2015 | |
| WO | 201587677 A1 | 6/2015 | |
| WO | 2020200624 A1 | 10/2020 | |

OTHER PUBLICATIONS

United States Patent and Trademark Office, "Notice of Allowance and Fee(s) Due," issued in connection with U.S. Appl. No. 17/840,400, mailed on Oct. 3, 2023, 15 pages.
United States Patent and Trademark Office, "Non-Final Office Action," issued in connection with U.S. Appl. No. 17/840,410, dated Feb. 8, 2024, 10 pages.
United States Patent and Trademark Office, "Restriction Requirement," issued May 16, 2024 in connection with U.S. Appl. No. 17/840,406, 5 pages.
United States Patent and Trademark Office, "Requirement for Restriction / Election," issued in connection with U.S. Appl. No. 17/840,404, dated May 17, 2024, 9 pages.
United States Patent and Trademark Office, "Requirement for Restriction/Election," issued in connection with U.S. Appl. No. 17/840,414, dated May 23, 2024, 6 pages.
United States Patent and Trademark Office, "Non-Final Office Action," issued in connection with U.S. Appl. No. 17/840,414, dated Jul. 30, 2024, 9 pages.
United States Patent and Trademark Office, "Non-Final Office Action," issued in connection with U.S. Appl. No. 17/840,416, dated Aug. 27, 2024, 12 pages.
United States Patent and Trademark Office, "Final Office Action," issued in connection with U.S. Appl. No. 17/840,410, dated Sep. 5, 2024, 11 pages.
United States Patent and Trademark Office, "Requirement for Restriction," issued in connection with U.S. Appl. No. 17/840,404, dated Oct. 8, 2024, 6 pages.
United States Patent and Trademark Office, "Requirement for Restriction," issued in connection with U.S. Appl. No. 17/840,406, dated Oct. 21, 2024, 6 pages.
United States Patent and Trademark Office, "Final Office Action," issued in connection with U.S. Appl. No. 17/840,414, dated Nov. 18, 2024, 7 pages.
United States Patent and Trademark Office, "Final Office Action," issued in connection with U.S. Appl. No. 17/840,416, dated Feb. 19, 2025, 12 pages.

(56) References Cited

OTHER PUBLICATIONS

United States Patent and Trademark Office, "Non-Final Office Action," issued in connection with U.S. Appl. No. 17/840,404, dated Feb. 20, 2025, 12 pages.

United States Patent and Trademark Office, "Notice of Allowance and Fee(s) Due," issued in connection with U.S. Appl. No. 17/840,414, dated Feb. 16, 2025, 7 pages.

United States Patent and Trademark Office, "Non-Final Office Action," issued in connection with U.S. Appl. No. 17/840,406, dated Mar. 21, 2025, 12 pages.

* cited by examiner

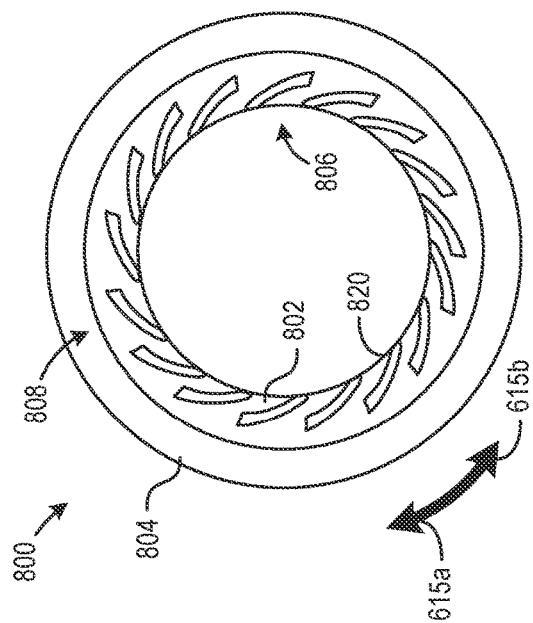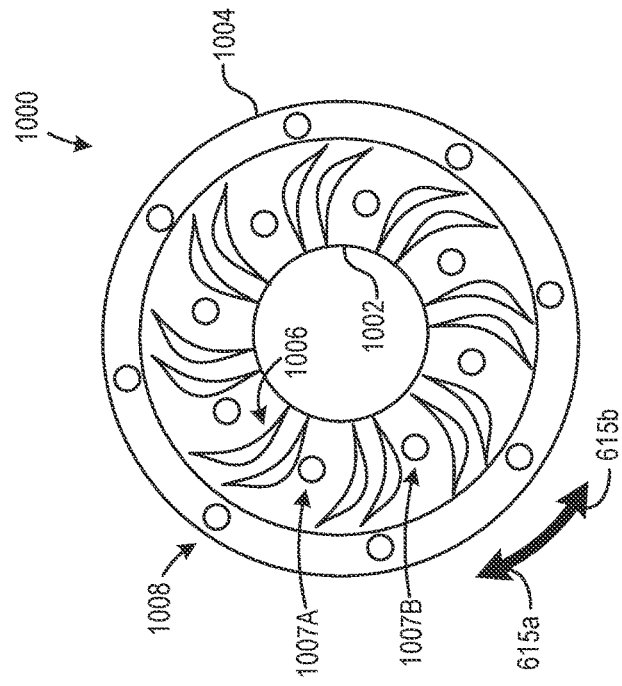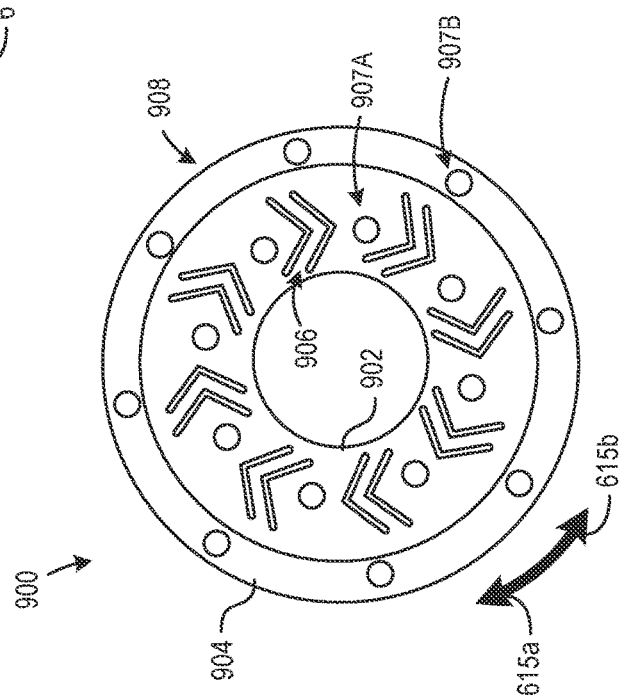

DUAL THRUST BEARING SYSTEMS AND METHODS FOR OPERATING THE SAME

RELATED APPLICATION

This patent claims the benefit of Indian Provisional Patent Application No. 202311007068, which was filed on Feb. 3, 2023. Indian Provisional Patent Application No. 202311007068 is hereby incorporated herein by reference in its entirety. Priority to Indian Provisional Patent Application No. 202311007068 is hereby claimed.

FIELD OF THE DISCLOSURE

This disclosure relates generally to thrust bearings, and, more particularly, to thrust bearings in thermal transport bus pumps.

BACKGROUND

Aircraft typically include accessory systems to support the operation of the aircraft and/or its gas turbine engine(s). Such accessory systems may include a lubrication system that lubricates components of the engine(s), an engine cooling system that provides cooling fluid to engine components, an environmental control system that provides cooled air to the cabin of the aircraft, etc. The operation of the accessory systems involves transferring heat between fluid(s) (e.g., oil, air, etc.) utilized in the accessory systems and a working fluid (e.g., supercritical carbon dioxide, liquid helium, etc.). As such, aircraft also include a thermal management system having to a thermal transport bus fluidly coupled to a pump and one or more heat exchangers. The pump drives the working fluid through the thermal transport bus and the heat exchangers, and the working fluid acts as a heat sink or a heat source for the various accessory systems.

BRIEF DESCRIPTION OF THE DRAWINGS

FIG. 8 is a front view of an example third thrust pad that can be implemented in the first and/or second thrust bearings of FIGS. 4 and/or 5.

FIG. 9 is a front view of an example fourth thrust pad that can be implemented in the first and/or second thrust bearings of FIGS. 4 and/or 5.

FIG. 10 is a front view of an example fifth thrust pad that can be implemented in the first and/or second thrust bearings of FIGS. 4 and/or 5.

The figures are not to scale. In general, identical reference numbers used throughout the drawing(s) indicate the same elements, and accompanying written descriptions refer to the same or like parts.

DETAILED DESCRIPTION

Figure 1:
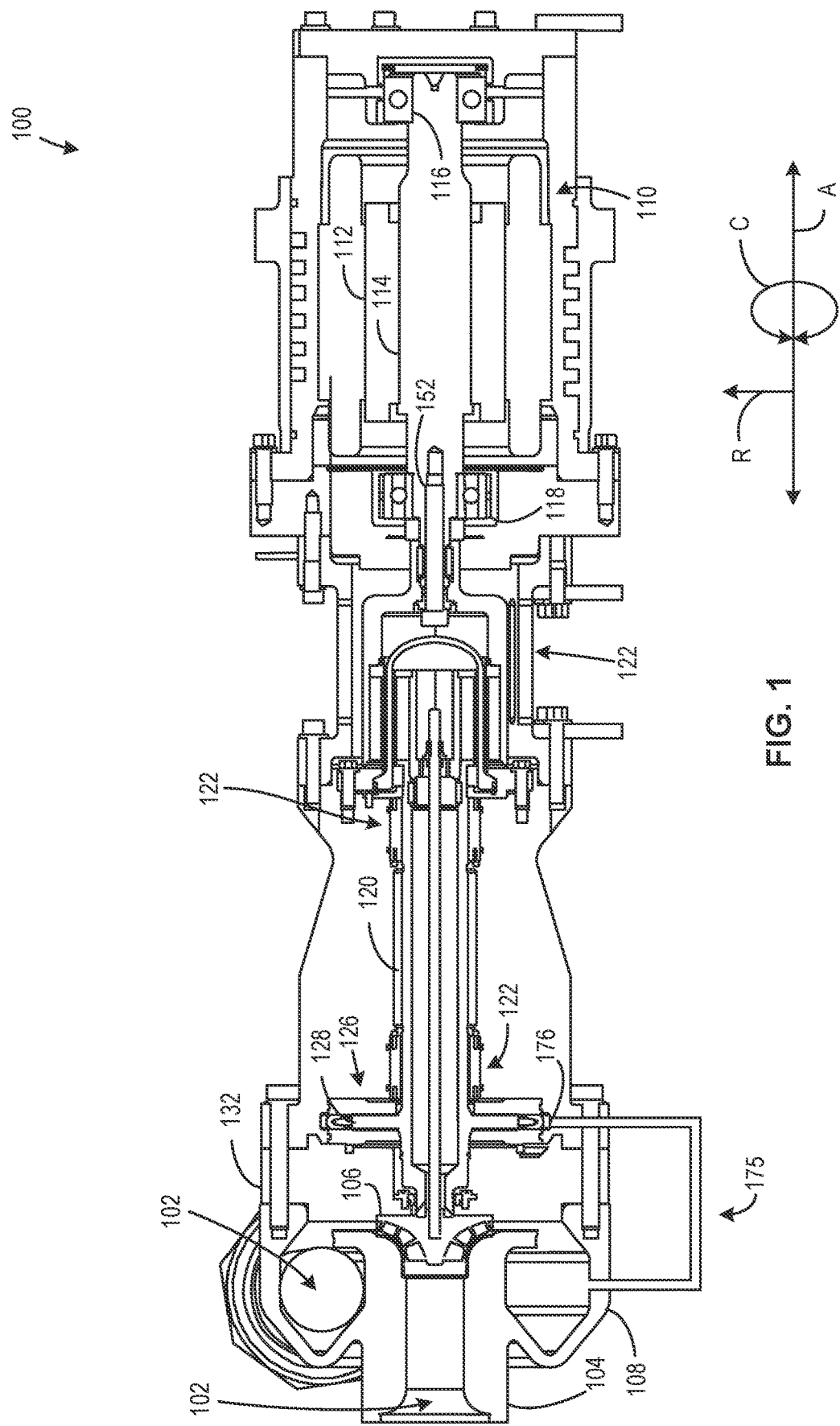
FIG. 1 is a cross-sectional side view of an example thermal transport bus pump.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

As used herein, the terms "upstream" and "downstream" refer to the location along a fluid flow path relative to the direction of fluid flow. For example, with respect to a fluid flow, "upstream" refers to a location from which the fluid flows, and "downstream" refers to a location toward which the fluid flows. For example, with regard to a flame arrester, a protected side is said to be upstream of an unprotected side, and a gas is said to flow from the protected side to the unprotected side.

As used herein, in the context of describing the position and/or orientation of a first object relative to a second object, the term "substantially orthogonal" encompasses the term orthogonal and more broadly encompasses a meaning in which the first object is positioned and/or oriented relative to the second object at an absolute angle of no more than five degrees (5°) from orthogonal. For example, a first axis that is substantially orthogonal to a second axis is positioned and/or oriented relative to the second axis at an absolute angle of no more than five degrees (5°) from orthogonal.

As used herein, "axially" is used to express a location along a central axis of a rotating body. For example, a shaft of a pump is said to extend axially along the axis of rotation of the pump. As used herein, "radially" is used to express a location along a radial vector originating at the central axis of the rotating body and pointing perpendicularly outward from the central axis. For example, a thrust disk is said to extend radially outward from the shaft, meaning that the thrust disk is substantially orthogonal to the axis of rotation. As used herein, "circumferentially" is used to express a location along an arc or circle positioned at a radial distance from the central axis of the rotating body. For example, the thrust disk is said to have a channel located circumferentially along the thrust disk.

Thermal transport bus (TTB) pumps used in thermal management systems onboard aircraft (e.g., within the gas turbine engine(s), etc.) include a compressor (e.g., impeller, rotor, etc.) coupled to a power source (e.g., motor, turbine, etc.) via a shaft. In some examples, the TTB pump includes an impeller coupled to the shaft to pressurize a working fluid in the TTB of the thermal management system. The impeller of the TTB pump pulls in the working fluid axially along an axis of rotation of the shaft and expels the fluid radially outward into a compressor collector (e.g., a volute chamber, etc.). The pressurized working fluid accelerates through the compressor collector and into the TTB.

As the working fluid flows into the impeller, thrust loads (or axial loads) are imparted on the impeller towards an aft end of the TTB pump. In some examples, a portion of the working fluid is siphoned from the compressor collector and circulated through the pump to cool certain elements (e.g., motor(s), housing(s), etc.) and/or to support shaft bearings (e.g., thrust bearings, radial bearings, etc.). The working fluid within the TTB pump may flow forward toward an aft side of the impeller along the axis of rotation of the shaft. In some examples, the impeller is a double impeller that includes expeller vanes on the aft side to draw the working fluid forward along the axis of rotation and back into the compressor collector. As such, thrust loads are also imparted on the impeller towards a forward end of the TTB pump.

Due to the coupling between the shaft and the impeller, the thrust loads are transferred along the shaft. Thus, the TTB pump includes a thrust bearing to support thrust loads, which reduces axial movement of the shaft, reduces friction, improves performance of the TTB pump, and reduces wear of the elements therein. In some examples, the TTB pump includes two or more thrust bearing apparatus to provide further thrust support to the shaft and to improve thrust load distribution.

Conventional thrust bearings include a thrust disk coupled to and/or extending radially from the shaft, a bearing housing surrounding the thrust disk, and thrust pads on either side of the thrust disk. In some examples, the thrust bearings are hydrodynamic bearings that pressurize the working fluid between the thrust disk and the thrust pads to support the thrust loads. However, due to the various operating conditions of the aircraft and the associated accessory systems, the fluid properties (e.g., temperature, pressure, etc.) of the working fluid can fluctuate in the TTB and in the TTB pump. As such, the thrust loads acting on the forward side and the aft side of the impeller can also fluctuate. Moreover, the thrust loads acting on the impeller may transition between primarily acting in the forward direction and the aft direction based on the cycle conditions of the TTB. As used herein, "thrust crossover" refers to the transitional period when the thrust load changes direction (e.g., from forward direction to aft direction) and when the thrust load is balanced. During thrust crossover, the magnitude of the thrust is zero or near zero because of the equally opposing loads on the impeller, and the stresses on the thrust disks reach a minimum value. As such, thrust crossovers can generate non-synchronous vibrations (NSVs) of the shaft, which can be difficult to dampen, decrease performance of the TTB pump, and accelerate wear of the elements within the TTB pump.

Dual thrust bearing systems and methods for operating the same are disclosed herein. Disclosed dual thrust bearing systems improve the thrust balance of the shaft of a TTB pump while reducing instances of thrust crossovers. The TTB pump includes dual thrust bearings (a first thrust bearing apparatus and a second thrust bearing apparatus) each including a thrust disk extending from the shaft, a bearing housing surrounding the thrust disk, a first thrust pad (e.g., rotor thrust pad) coupled to a side of the thrust disk, and a second thrust pad (e.g., stator thrust pad) coupled to a wall of the bearing housing that faces the side of the thrust disk. As such, the first and second thrust pads are positioned on the same side of the thrust disk. For the first thrust bearing (e.g., forward thrust bearing apparatus or assembly), the rotor and stator thrust pads are positioned on the aft side of the corresponding thrust disk. For the second thrust bearing (e.g., aft thrust bearing apparatus or assembly), the rotor and stator thrust pads are positioned on the forward side of the corresponding thrust disk.

The dual thrust bearing system includes a secondary flowline that splits into a first flowline leading to the aft side of the first thrust bearing and a second flowline leading to the forward side of the second thrust bearing. In some examples, a pressure control valve is fluidly coupled to the second flowline to regulate the pressure in the first and second flowlines. When the thrust load acts too strongly in one direction (e.g., the aft direction), the pressure control valve can increase the pressure in the opposing flowline (e.g., the first flowline) to balance the thrust load. By contrast, when the thrust load becomes too balanced (e.g., difference between forward thrust and aft thrust is near zero), the pressure control valve can increase the pressure in the corresponding flowline (e.g., the second flowline) to ensure thrust crossover does not occur and that NSVs are inhibited.

The first and second thrust pads include hydrodynamic features (e.g., serrations, grooves, etc.) in a circumferential pattern to increase the thrust carrying capacity of the thrust bearing. Furthermore, the thrust pads include plane surfaces (e.g., flat portions) and serrated surfaces (e.g., grooved portions) to customize the thrust carrying capability of the corresponding thrust bearing. Such thrust carrying capacities can be further modified based on the first flowline splitting into a third flowline and a fourth flowline and/or the second flowline splitting into a fifth flowline and a sixth flowline. Moreover, the third, fourth, fifth, and/or sixth flowlines can include other pressure control valves to modify the thrust carrying capacities of the first and/or second thrust bearings.

Disclosed dual thrust bearing systems are more reliable than known thrust bearing systems and can provide effective thrust balancing capabilities while reducing the occurrences of thrust crossovers. As such, dual thrust bearing systems can use smaller thrust disks, which reduces the weight of the TTB pump. Furthermore, improved load balance and reduction of NSVs associated with thrust crossovers reduces the wear of the elements of the TTB pump, which increases the time between required servicing. Thus, as disclosed herein, dual thrust bearing systems and methods for operating the same improve the performance, reduce the size, reduce the weight, and reduce the wear of the TTB pump.

FIG. 1 illustrates a schematic cross-sectional side view of an example thermal transport bus (TTB) pump 100 (e.g., a fluid pump, an advanced Brayton cycle pump, a supercritical carbon dioxide (sCO2) pump, etc.). In the illustrated example of FIG. 1, the TTB pump 100 drives a working fluid (e.g., sCO2, etc.) through one or more fluid conduits 102 connected to a flowline or a thermal transport bus. Specifically, the fluid flows through an inlet pipe 104 and encounters an impeller 106 (e.g., a compressor wheel) that rotates to drive the fluid through a compressor collector 108 (e.g., a volute chamber) fluidly coupled to the fluid conduit(s) 102.

In turn, the fluid conduit(s) 102 can feed the fluid to one or more heat exchangers via the thermal transport bus. Accordingly, the TTB pump 100 can pump the fluid to manage a thermal energy of working fluids associated with an aircraft, a gas turbine engine of the aircraft, and/or another suitable system.

In the illustrated example of FIG. 1, the TTB pump 100 includes a motor 110 (e.g., an induction motor, etc.) to drive (e.g., rotate) the impeller 106. A rotor 112 of the motor 110 is fixedly coupled to a first shaft 114. As such, the motor 110 drives a rotation of the first shaft 114. An aft end of the first shaft 114 is supported by a first roller bearing 116 (e.g., a first rolling element bearing). A forward end of the shaft 114 is supported by a second roller bearing 118 (e.g., a second rolling element bearing). The first shaft 114 is coupled to a second shaft 120 via a coupling 122. In the example of FIG. 1, the coupling 122 is a magnetic coupling. However, the coupling 122 can be a mechanical coupling (e.g., bolted fastener, splined connection, welding, etc.), a chemical coupling (e.g., adhesives, etc.), etc. The second shaft 120 is coupled to the impeller 106. Thus, motor 110 causes the impeller 106 to rotate and pump the fluid.

In the illustrated example of FIG. 1, radial loading (e.g., the weight) and/or vibrations of the second shaft 120 are supported by journal bearings 124. Furthermore, axial thrust of the second shaft 120 is supported by a thrust bearing 126. The TTB pump includes a thrust disk 128 radially protruding from the second shaft 120. In some examples, the journal bearings 124 and the thrust bearing 126 are foil bearings. In the illustrated example, the thrust bearing 126 is a hydrodynamic bearing that uses the working fluid (e.g., sCO2, etc.) as a lubricant.

In the illustrated example of FIG. 1, the TTB pump 100 includes a secondary flow network 130 to transmit the working fluid to the thrust bearing 126 for lubrication and hydrodynamic support (e.g., fluid pressure support). The secondary flow network 130 includes an outlet 132 coupled to the thrust bearing 126. As such, the working fluid enters in the secondary flow network 130 from the compressor collector 108 and flows into the thrust bearing 126 via the outlet 132 to lubricate and support to the thrust disk 128.

Figure 2:
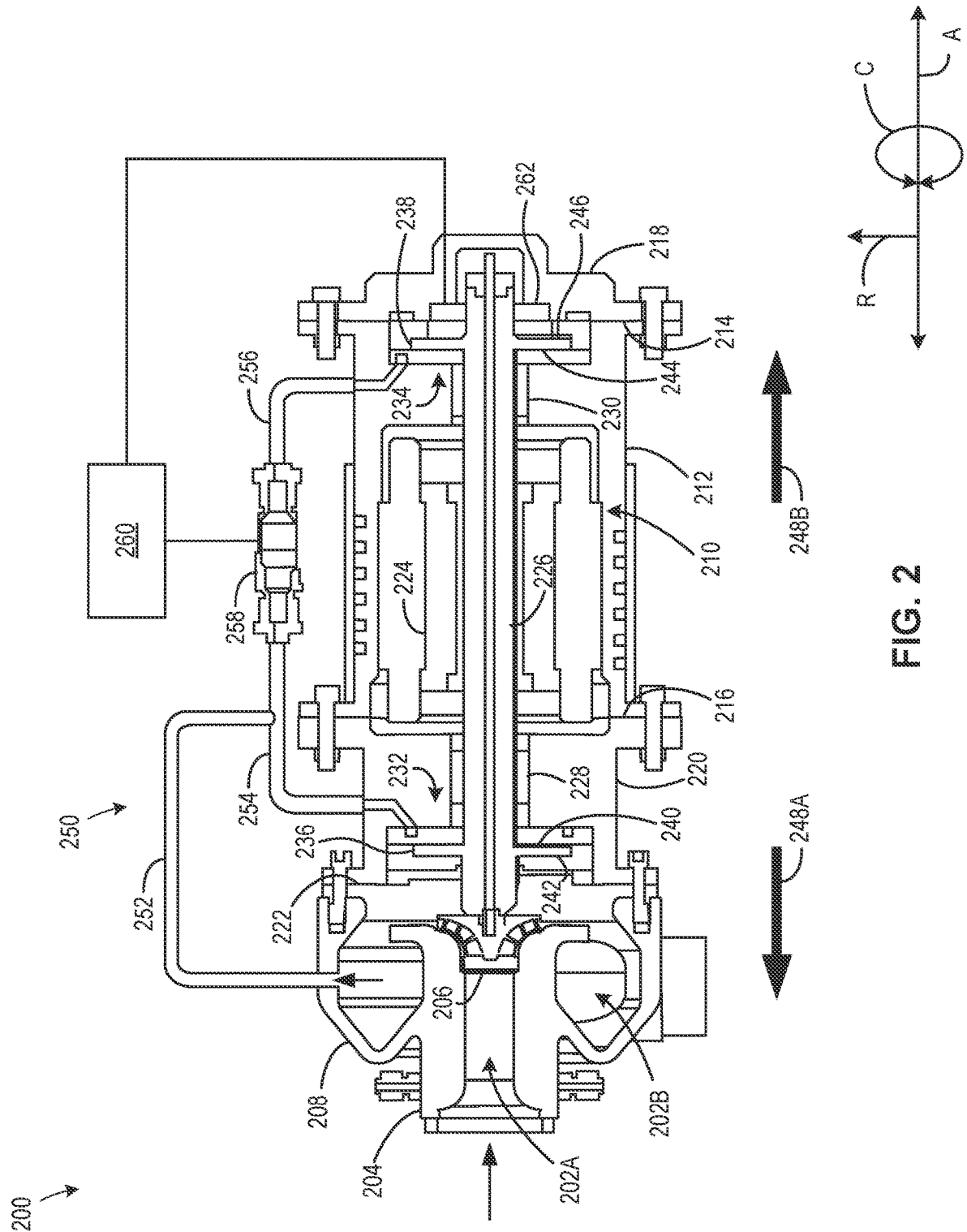
FIG. 2 is a cross-sectional side view of an example thermal transport bus pump in accordance with teachings disclosed herein.

FIG. 2 illustrates a schematic cross-sectional side view of an example thermal transport bus (TTB) pump 200 in accordance with the teachings disclosed herein. The TTB pump of FIG. 2 is similar to the TTB pump of FIG. 1. However, in FIG. 2, the TTB pump 200 is axially shortened to conserve volume and weight. The TTB pump 200 drives a working fluid or heat transfer fluid (e.g., sCO2, liquid helium, etc.) through the thermal transport bus via an inlet fluid conduit 202A and an outlet fluid conduit 202B. Specifically, the fluid flows into an inlet pipe 204, pressurizes due to rotation of a compressor 206 (e.g., an impeller, an axial compressor, etc.), and accelerates radially outward into a compressor collector 208 (e.g., volute chamber). The fluid flows from the compressor collector 208 through outlet fluid conduit 202B into the thermal transport bus.

In the illustrated example of FIG. 2, the TTB pump 200 is a centrifugal pump, and the compressor 206 is an impeller. In some examples, the TTB pump 200 is an axial pump, and the compressor 206 is an axial compressor having a plurality of rotor blades and stator vanes to pressurize the working fluid in the compressor collector 208. In some examples, the compressor 206 is a double impeller including expeller vanes on an aft side thereof to drive the working fluid from within the TTB pump 200 back into the compressor collector 208.

The TTB pump 200 includes a motor 210 (e.g., an induction motor) positioned in a motor housing 212. The motor 210 is operatively coupled to the compressor 206 to cause rotation thereof. In some examples, the motor 210 is controlled by a FADEC on the aircraft.

In the illustrated example of FIG. 2, an aft end 214 of the motor housing 212 is coupled to an aft bearing housing 218. A forward end 216 of the motor housing 212 is coupled to an intermediate bearing housing 220. In some examples, the various housings (e.g., motor housing 212, aft bearing housing 218, intermediate bearing housing 220, etc.) are coupled or fixed together via bolts and flanges. Furthermore, the intermediate bearing housing 220 is coupled to a backplate 222 and the compressor collector 208. The compressor collector 208 is positioned on the opposite side of the backplate 222.

The motor 210 includes an armature 224 that is coupled to a shaft 226. As such, when the motor 210 causes rotation of the armature, the shaft 226 also rotates at the same rate. Furthermore, the shaft 226 is coupled to the compressor 206 such that kinetic energy of the armature 224 transfers to the compressor 206 via the shaft 226. The TTB pump 200 includes a first radial bearing 228 and a second radial bearing 230 to support radial loading of the shaft 226. The first radial bearing 228 and/or the second radial bearing 230 can be journal bearings, rolling element bearings, hydrodynamic bearings, foil bearings, etc.

The TTB pump 200 includes a first thrust bearing apparatus or first thrust bearing 232 (e.g., forward thrust bearing) and a second thrust bearing apparatus or second thrust bearing 234 (e.g., aft thrust bearing) to support axial thrust of the shaft 226. Specifically, the first thrust bearing 232 is configured to support aft thrust acting on the shaft 226, and the second thrust bearing 234 is configured to support forward thrust acting on the shaft 226. In FIG. 2, the first thrust bearing 232 and the second thrust bearing 234 are hydrodynamic thrust bearings that utilize the pressurized working fluid to support the thrust loading of the shaft 226. As such, the TTB pump 200 includes a first thrust disk 236 and a second thrust disk 238 radially extending from the shaft 226 and positioned within the first and second thrust bearings 232, 234, respectively. Because the TTB pump 200 of FIG. 2 includes two thrust bearings (first and second thrust bearings 232, 234), the TTB pump 200 has an improved thrust load distribution relative to the TTB pump 100 of FIG. 1.

As shown in FIG. 2, the first thrust disk 236 has a first side 240 and a second side 242 opposite the first side 240. The second thrust disk 238 has a third side 244 and a fourth side 246 opposite the third side 244. In the illustrated example, the first side 240 of the first thrust disk 236 corresponds to an aft side of the first thrust disk 236. The third side 244 of the second thrust disk 238 corresponds to a forward side of the second thrust disk 238. Further details of the first thrust bearing 232 and the second thrust bearing 234 are described below in connection with FIGS. 4 and 5.

During operation, axial loads on the compressor 206 and the shaft 226 can act in a forward direction 248A and/or an aft direction 248B relative to the TTB pump 200. As used herein, "forward thrust" refers to unbalanced thrust load acting on the shaft 226 primarily in the forward direction 248A due to a forward thrust load exceeding an aft thrust load. As used herein, "aft thrust" refers to unbalanced thrust load acting on the shaft 226 primarily in the aft direction 248B due to the aft thrust load exceeding the forward thrust load.

In the illustrated example of FIG. 2, the TTB pump 200 includes a dual thrust bearing system 250 to improve thrust load balance of the shaft 226 while reducing (e.g., eliminating) occurrences of thrust crossovers. The dual thrust bearing system includes the first thrust bearing 232 and the second thrust bearing 234. The dual thrust bearing system 250 controls the amount of working fluid that flows from the compressor collector 208 to the first thrust bearing 232 and the second thrust bearing 234 based on the magnitude and direction of thrust acting on the shaft 226.

During operation of the TTB pump 200, the working fluid pressure in the inlet pipe 204 can fluctuate based on the amount of heat transferred to or from the fluid throughout the thermal transport bus (e.g., upstream of the inlet fluid conduit 202A and/or downstream of the outlet fluid conduit 202B). Thus, the aft thrust loads from the working fluid pressure acting on the compressor 206 can vary based on the properties of the working fluid. Furthermore, fluctuation of the temperature and pressure of the working fluid in the compressor collector 208 causes fluctuation of the fluid properties in the dual thrust bearing system 250. In some examples, as the working fluid flows to the first and second thrust bearings 232, 234, the compressor 206 (e.g., double impeller) draws the fluid along the shaft 226 (in the forward direction 248A) and back into the compressor collector 208 via expeller vanes. As such, fluid pressure also acts on the aft side of the compressor 206 (e.g., double impeller) in the forward direction 248A. Thus, as the fluid pressure in the compressor collector 208 fluctuates, the forward thrust loads fluctuate accordingly.

The various fluctuations of fluid properties on opposing sides of the compressor 206 can cause thrust crossover to occur, which corresponds to operating stages during which the thrust load transitions from the forward thrust to the aft thrust, or vice versa. During thrust crossovers, the shaft 226 can experience non-synchronous vibrations (NSVs), which are vibrations at frequencies that are not integer multiples of the frequency of the shaft 226. Such NSVs are unpredictable, difficult to dampen, and may result in reduced performance or accelerated wear of the TTB pump 200.

As such, when the aft thrust satisfies (e.g., exceeds) an upper threshold, the dual thrust bearing system 250 increases the pressure of the working fluid flowing to the first thrust bearing 232 to increase the aft thrust support (or mitigate the aft thrust). Alternatively, when the aft thrust does not satisfy (e.g., falls below) a lower threshold, the dual thrust bearing system 250 increases the pressure of the working fluid flowing to the second thrust bearing 234 to reduce the aft thrust support (or reduce the thrust balance). Such a configuration ensures that some aft thrust acts on the shaft 226 without crossing over to the forward thrust. Additionally or alternatively, the dual thrust bearing system 250 can ensure some forward thrust acts on the shaft 226 without crossing over to the aft thrust based on the desired performance of the TTB pump 200. That is, the dual thrust bearing system 250 can increase the pressure of the working fluid flowing to the second thrust bearing 234 when the forward thrust satisfies the upper threshold and increase the pressure of the working fluid flowing to the first thrust bearing 232 when the forward thrust does not satisfy the lower threshold. In some examples, values of the upper and lower thresholds are based on the types of thrust pads used in example thrust bearings disclosed below.

In the illustrated example of FIG. 2, the dual thrust bearing system 250 includes a secondary flowline 252 fluidly coupled to the compressor collector 208. The secondary flowline 252 splits into a first flowline 254 and a second flowline 256 to transmit the working fluid from the compressor collector 208 to the first and second thrust bearings 232, 234, respectively. Specifically, the first flowline 254 is fluidly coupled to the first thrust bearing 232 to transmit the working fluid to the first side 240 of the first thrust disk 236. The second flowline 256 is fluidly coupled to the second thrust bearing 234 to transmit the working fluid to the third side 244 of the second thrust disk 238.

The TTB pump 200 and the dual thrust bearing system 250 of FIG. 2 includes a pressure control valve 258 (e.g., a first pressure control valve 258) to adjust the pressure of the working fluid in the first flowline 254 and the second flowline 256. In the illustrated example, the pressure control valve 258 is an electromechanical two-way valve (e.g., a solenoid valve, etc.). The dual thrust bearing system 250 includes a control system 260 (described in connection with FIG. 11) to actuate a core (e.g., plunger, disk, diaphragm, ball, globe, gate, etc.) of the pressure control valve 258 to an opened position, a closed position, or a partially opened position. As such, the pressure control valve 258 can be a proportional pressure control valve capable of generating variable apertures (e.g., partial effective areas) ranging from a fully open area to a fully closed area to adjust the output pressure gradually.

As shown in FIG. 2, the pressure control valve 258 is fluidly coupled to the second flowline 256 to adjust the pressure in the first and second flowlines 254, 256. In some examples, the pressure control valve 258 is fluidly coupled to the first flowline 254. In some other examples, the pressure control valve 258 is a three-way valve and is fluidly coupled to the secondary flowline 252, the first flowline 254 and the second flowline 256. In such examples, the secondary flowline 252 provides fluid to an inlet of the pressure control valve 258, the first flowline 254 is fluidly coupled to a first outlet of the pressure control valve 258, and the second flowline 256 is fluidly coupled to a second outlet of the pressure control valve 258.

In the illustrated example of FIG. 2, the TTB pump 200 and the dual thrust bearing system 250 includes a load cell 262 to measure the forward thrust load and the aft thrust load acting on the shaft 226. The load cell 262 can be a rotary load cell, a donut load cell, or another type of thrust load cell capable of measuring axial or thrust loads of a rotating shaft. Thus, in some examples, the load cell 262 is coupled to the shaft 226 and is positioned between opposing collars. In such examples, thrust bearings (e.g., rolling element thrust bearings) are positioned between the load cell 262 and the collars to support the load cell 262 and to enable low-friction rotation of the load cell 262 in conjunction with the shaft 226.

The control system 260 can be an automatic and/or closed loop controller (e.g., proportional-integral-derivative (PLD) controller, full authority digital electronics controller (FADEC), etc.). The control system 260 is communicatively coupled to the pressure control valve 258 and the load cell 262 via wired connections (e.g., Ethernet, coaxial, universal serial bus (USB), etc.) and/or wireless connections (e.g., Bluetooth, cellular, Wi-Fi, near field communication (NFC), etc.). As such, the control system 260 obtains an input signal (e.g., electronic signal, etc.) from the load cell 262 representing the forward thrust and aft thrust of the shaft 226. Further, the control system 260 sends an output signal (e.g., control signal, etc.) to the pressure control valve 258 representing a position of the actuator (e.g., plunger, shaft, valve, gate, ball, globe, etc.). In other words, the control system 260 uses the pressure control valve 258 to increase the pressure in the first flowline 254 when the aft thrust satisfies the upper threshold. Additionally, the control system 260 uses the pressure control valve 258 to increase the pressure in the second flowline 256 when the aft thrust does not satisfy the lower threshold. Thus, the dual thrust bearing system 250 includes the pressure control valve 258, the control system 260, and the load cell 262 to improve the thrust load balance of the TTB pump 200 while reducing the occurrence of thrust crossovers. Additional details regarding the control system 260 will be described herein with respect to FIG. 11.

In some examples, the TTB pump 200 and/or the dual thrust bearing system 250 include(s) means for supporting aft thrust on the shaft 226 of the TTB pump 200. For example, the means for supporting aft thrust may be implemented by the first thrust bearing 232.

In some examples, the TTB pump 200 and/or the dual thrust bearing system 250 include(s) means for supporting forward thrust on the shaft 226 of the TTB pump 200. For example, the means for supporting forward thrust may be implemented by the second thrust bearing 234.

In some examples, the TTB pump 200 and/or the dual thrust bearing system 250 include(s) means for transmitting the working fluid from the compressor collector 208 of the TTB pump 200 to the aft thrust supporting means (e.g., the first thrust bearing 232) and/or the forward thrust supporting means (e.g., the second thrust bearing 234). For example, the means for transmitting may be implemented by the secondary flowline 252, the first flowline 254, and/or the second flowline 256.

In some examples, the TTB pump 200 and/or the dual thrust bearing system 250 include(s) means for adjusting a first pressure in the aft thrust supporting means (e.g., the first thrust bearing 232) and a second pressure in the forward thrust supporting means (e.g., the second thrust bearing 234). For example, the means for adjusting may be implemented by the pressure control valve 258.

In some examples, the TTB pump 200 and/or the dual thrust bearing system 250 include(s) means for controlling the adjusting means (e.g., the pressure control valve 258). For example, the means for controlling may be implemented by the control system 260. Furthermore, the controlling means can at least detect, using means for measuring thrust loads (e.g., the load cell 262), an aft thrust or a forward thrust acting on the shaft 226, increase, using the adjusting means, the first pressure in the aft thrust supporting means when (i) the aft thrust satisfies an upper threshold or (ii) when the forward thrust does not satisfy a lower threshold, and increase, using the adjusting means, the second pressure in the forward thrust supporting means when (i) the forward thrust satisfies the upper threshold or (ii) when the aft thrust does not satisfy the lower threshold.

Figures 3A, 3B:
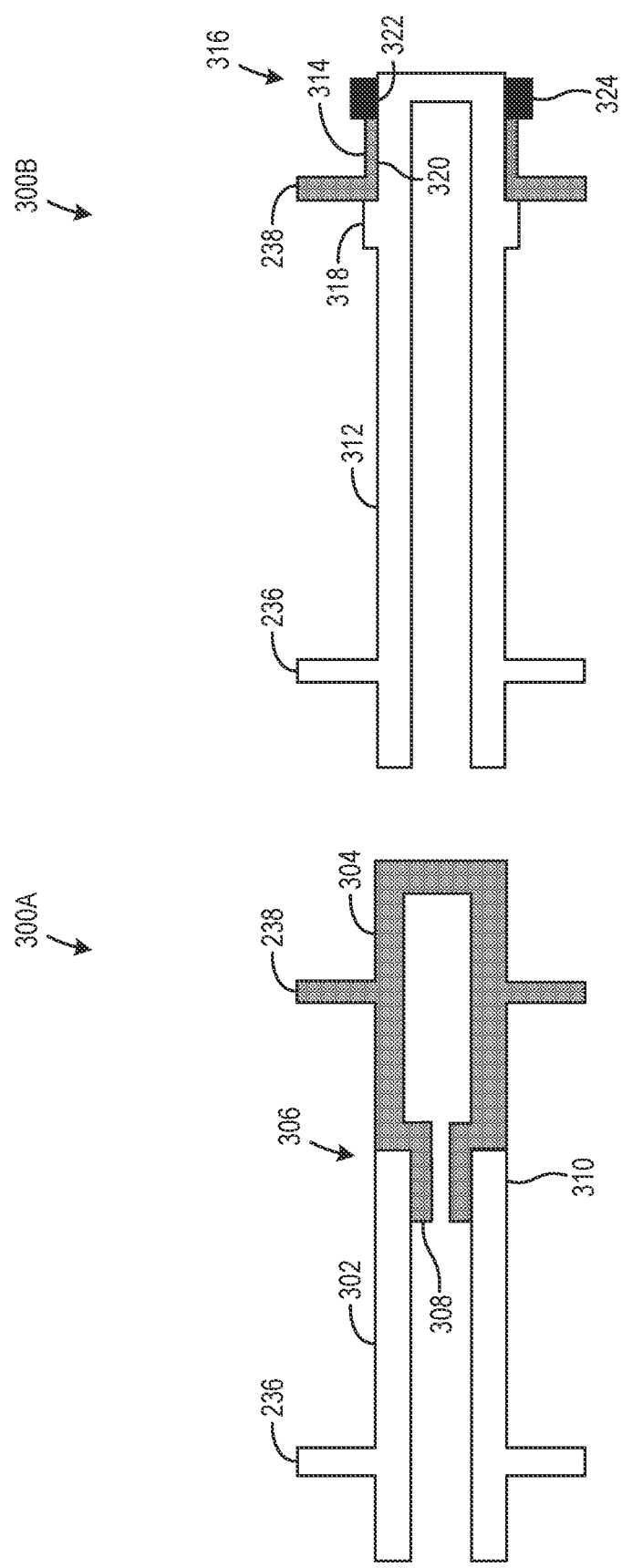
FIG. 3A is a cross-sectional side view of an example first shaft assembly that can be implemented in the thermal transport bus pump of FIG. 2.
FIG. 3B is a cross-sectional side view of an example second shaft assembly that can be implemented in the thermal transport bus pump of FIG. 2.

FIG. 3A illustrates a schematic cross-sectional side view of an example first shaft assembly 300A that may be implemented in the TTB pump 200 of FIG. 2. Specifically, the first shaft assembly 300A can be implemented as the shaft 226 in the TTB pump 200 of FIG. 2. The first shaft assembly 300A includes a first shaft 302 and a second shaft 304 coupled together via a spline connection 306 to facilitate the assembly of the TTB pump 200 having the dual thrust bearing system 250. The first shaft 302 and the second shaft 304 are rotatably interlocked based on the spline connection 306. As shown, the first thrust disk 236 extends radially from the first shaft 302, and the second thrust disk 238 extends radially from the second shaft 304.

In the illustrated example of FIG. 3A, the second shaft 304 includes a male spline 308 and the first shaft 302 includes a female spline 310 to define the spline connection 306. In some examples, the male spline 308 includes ridges or teeth, and the female spline 310 includes matching grooves that mate with the male spline 308. The spline connection 306 enables the first shaft 302 to transfer torque to the second shaft 304 and to maintain the angular correspondence between the first and second shafts 302, 304. In some examples, the first shaft 302 includes the male spline 308 and the second shaft 304 includes the female spline 310.

FIG. 3B illustrates a schematic cross-sectional side view of an example second shaft assembly 300B that may be implemented in the TTB pump 200 of FIG. 2. Specifically, the second shaft assembly 300B can be implemented as the shaft 226 in the TTB pump 200 of FIG. 2. The second shaft assembly 300B includes a third shaft 312 and a fourth shaft 314 coupled together via a lock nut connection 316 to facilitate the assembly of the TTB pump 200 having the dual thrust bearing system 250. The third shaft 312 and the fourth shaft 314 are rotatably interlocked based on the lock nut connection 316. As shown, the first thrust disk 236 extends radially from the third shaft 312, and the second thrust disk 238 extends radially from the fourth shaft 314.

In the illustrated example of FIG. 3B, the third shaft 312 includes a seat 318, a smoothed portion 320, and a threaded end 322. The fourth shaft 314 fits onto the smoothed portion 320 and abuts the seat 318. In some examples, the second thrust disk 238 contacts the seat 318. In other examples, the fourth shaft 314 includes a sleeve extending axially from the second thrust disk 238 to contact the seat 318. The second shaft assembly 300B includes a nut 324 to couple the fourth shaft 314 to the third shaft 312. Specifically, the nut 324 applies a compressive force between the fourth shaft 314 and the seat 318 to fasten the fourth shaft 314 onto the third shaft 312.

Figure 4:
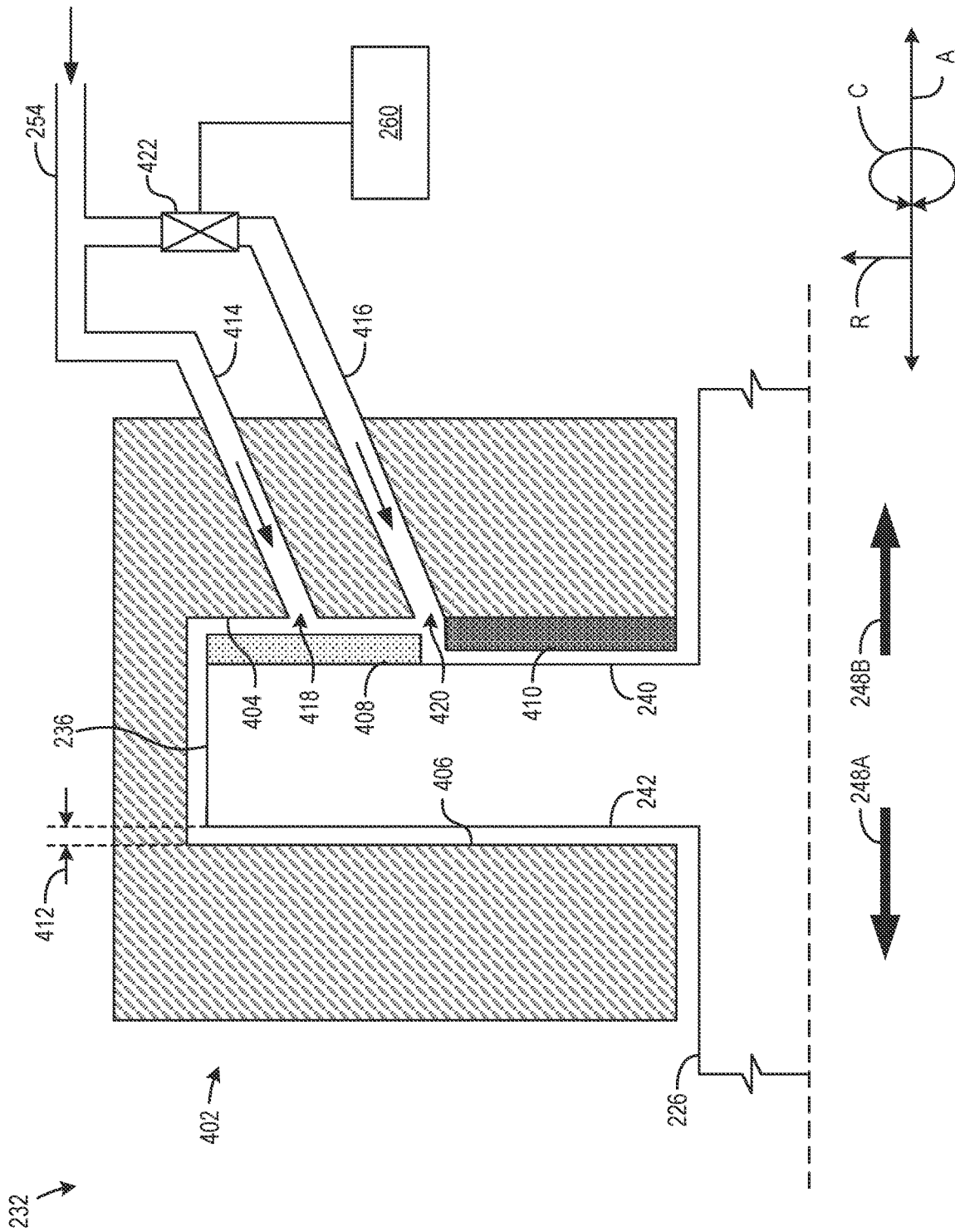
FIG. 4 is a cross-sectional side view of an example second thrust bearing in accordance with teachings disclosed herein.

FIG. 4 is a cross-sectional side view of the first thrust bearing 232 in accordance with teachings disclosed herein. The first thrust bearing 232 as illustrated in FIG. 4 may be implemented in the TTB pump 200 of FIG. 2 to support aft thrust on the shaft 226. The first thrust bearing 232 of FIG. 4 includes the first thrust disk 236 extending radially from the shaft 226. The first thrust bearing 232 further includes a first bearing housing 402 surrounding the first thrust disk 236. As such, the first thrust disk 236 is disposed within the first bearing housing 402. The first bearing housing 402 is coupled (e.g., fixed) to the intermediate bearing housing 220 and/or the backplate 222 of FIG. 2. The first bearing housing 402 includes a first wall 404 facing the first side 240 of the first thrust disk 236 and a second wall 406 facing the second side 242 of the first thrust disk 236. The first thrust bearing 232 includes a first thrust pad 408 coupled to the first side 240 of the first thrust disk 236 and a second thrust pad 410 coupled to the first wall 404 of the first bearing housing 402.

In the illustrated example of FIG. 4, the first thrust pad 408 (e.g., rotor thrust pad) rotates in conjunction with the first thrust disk 236. By contrast, the second thrust pad 410 (e.g., stator thrust pad) remains stationary with the first bearing housing 402. In some examples, the first thrust pad 408 is fixed to the first thrust disk 236 and the second thrust pad 410 is fixed to the first wall 404 via fasteners (e.g., adhesives, welding, bolts, etc.). The first thrust pad 408 does not overlap with the second thrust pad 410. In other words, no portions of the first thrust pad 408 and the second thrust pads 410 face each other. Thus, when the shaft 226 and the first thrust disk 236 move in the aft direction 248B, the first thrust pad 408 does not contact the second thrust pad 410. Furthermore, the first bearing housing 402 is configured such that a clearance 412 exists between the second side 242 of the first thrust disk 236 and the second wall 406. In some examples, the clearance 412 is present even when the first thrust disk 236 moves in the forward direction 248A.

In the illustrated example of FIG. 4, the first flowline 254 splits into a third flowline 414 and a fourth flowline 416. The third flowline 414 includes a first outlet 418 positioned adjacent to the first thrust pad 408. Thus, the third flowline 414 transmits the working fluid from the first flowline 254 to the first thrust pad 408. The fourth flowline 416 includes a second outlet 420 positioned radially between the first thrust pad 408 and the second thrust pad 410. Thus, the fourth flowline 416 transmits the working fluid from the first flowline 254 to the second thrust pad 410.

The third flowline 414 and the fourth flowline 416 transmit the working fluid axially to the first side 240 (aft side) of the first thrust disk 236. As such, the pressure in the third flowline 414 and the fourth flowline 416 act directly on the first thrust disk 236 to support the aft thrust of the shaft 226. As shown in FIG. 4, the third flowline 414 and the fourth flowline 416 are inclined, angled, or tilted radially outward relative to the shaft 226. As such, the flowlines 414, 416 are not orthogonal to nor aligned with the first thrust disk 236. The third and fourth flowlines 414, 416 are inclined to reduce pressure loss and to inhibit (e.g., prevent) backflow of the working fluid. That is, the third and fourth flowlines 414, 416 are inclined so gravity works with the fluid pressure to ensure the working fluid flows into the first bearing housing 402.

The first thrust bearing 232 of FIG. 4 includes a second pressure control valve 422 fluidly coupled to the fourth flowline 416 to regulate the fluid pressure acting on the first side 240 of the first thrust disk 236. The second pressure control valve 422 can be similar to the first pressure control valve 258 of FIG. 2. In some examples, the second pressure control valve 422 is an automatic valve, or a quick-opening valve, that can actuate to a fully opened position or a fully closed position based on an output signal or command from the control system 260. As such, the control system 260 is communicatively coupled to the second pressure control valve 422 via wired and/or wireless connection(s).

In some examples, the control system 260 uses the second pressure control valve 422 to increase the pressure in the fourth flowline 416 when the aft thrust satisfies the upper threshold. In some examples, the control system 260 uses the second pressure control valve 422 to reduce the pressure in the fourth flowline 416 when the aft thrust no longer satisfies the lower threshold. In some examples, the second pressure control valve 422 is fluidly coupled to the third flowline 414. Additionally or alternatively, the first thrust bearing 232 can include another pressure control valve fluidly coupled to the third flowline 414 such that both the third and fourth flowlines 414, 416 include a pressure control valve (e.g., the second pressure control valve 422, etc.).

Figure 5:
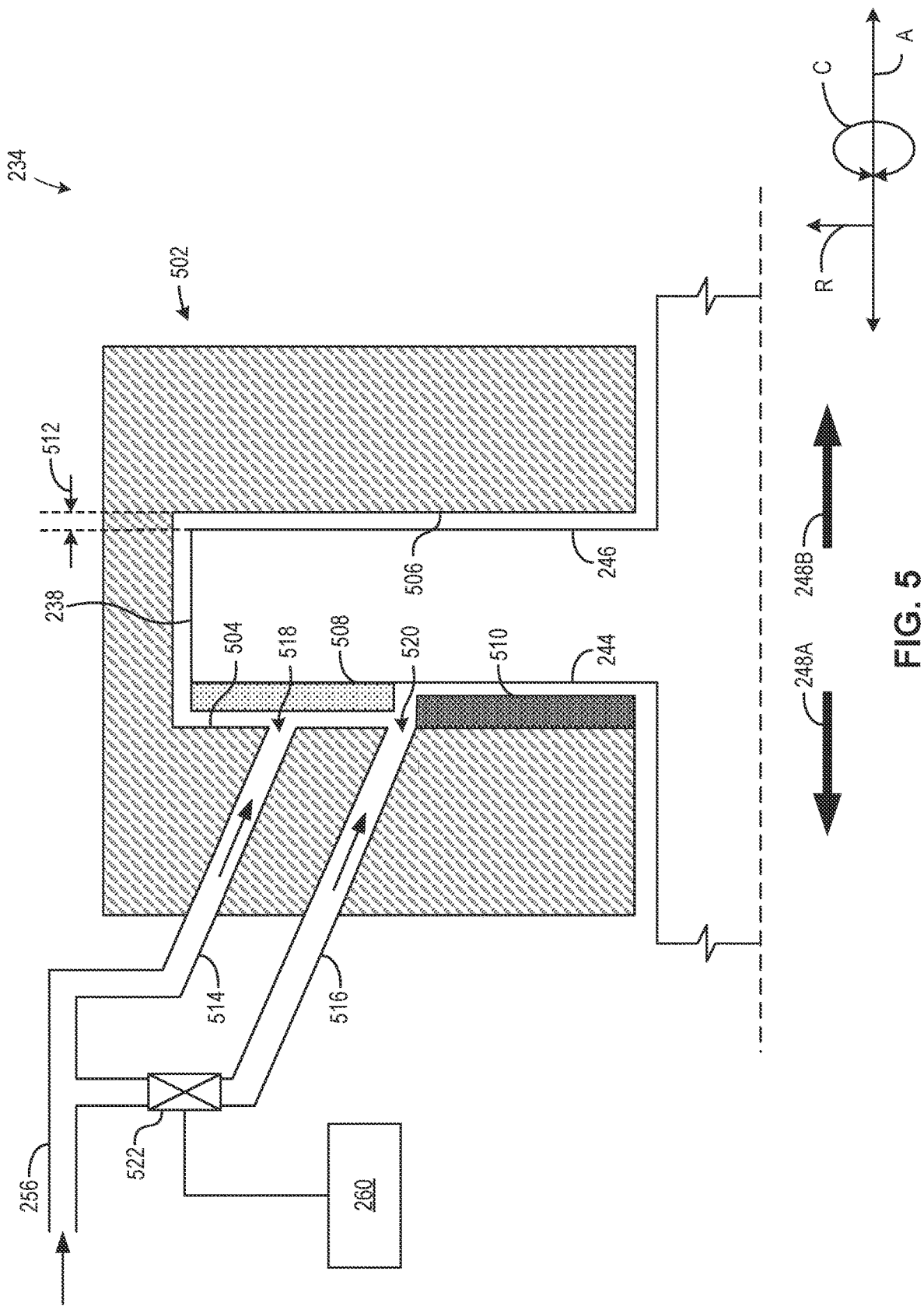
FIG. 5 is a cross-sectional side view of an example second thrust bearing in accordance with teachings disclosed herein.

FIG. 5 is a cross-sectional side view of the second thrust bearing 234 in accordance with teachings disclosed herein. The second thrust bearing 234, as illustrated in FIG. 5, may be implemented in the TTB pump 200 of FIG. 2 to support forward thrust on the shaft 226. The second thrust bearing 234 of FIG. 5 includes the second thrust disk 238 extending radially from the shaft 226. Similar to the first thrust bearing 232, the second thrust bearing 234 includes a second bearing housing 502 surrounding the second thrust disk 238 (the second thrust disk 238 disposed within the second bearing housing 502), a third wall 504 facing the third side 244 of the second thrust disk 238, and a fourth wall 506 facing the second side 242 of the first thrust disk 236. The second bearing housing 502 is coupled (e.g., fixed) to the motor housing 212 and/or the aft bearing housing 218 of FIG. 2. The second thrust bearing 234 includes a third thrust pad 508 coupled to the third side 244 of the second thrust disk 238 and a fourth thrust pad 510 coupled to the third wall 504 of the second bearing housing 502.

In the illustrated example of FIG. 5, the second bearing housing 502 is also configured such that a clearance 512 exists between the fourth side 246 of the second thrust disk 238 and the fourth wall 506. The clearance 512 of FIG. 5 is substantially similar to (e.g., within ten percent of) the clearance 412 of FIG. 4. Moreover, the second thrust bearing 234 includes the second flowline 256, which splits into a fifth flowline 514 and a sixth flowline 516. The fifth flowline 514 includes a third outlet 518 positioned adjacent to the third thrust pad 508, and the sixth flowline 516 includes a fourth outlet 520 positioned radially between the third thrust pad 508 and the fourth thrust pad 510. The second thrust bearing 234 includes a third pressure control valve 522 fluidly coupled to the sixth flowline 516 to regulate the fluid pressure acting on the third side 244 of the second thrust disk 238. In some examples, the third pressure control valve 522 is coupled to the fifth flowline 514. In some other examples, another pressure control valve is fluidly coupled to the fifth flowline 514 such that the fifth and sixth flowlines 514, 516 both include a pressure control valve (e.g., the third pressure control valve 522, etc.).

As shown, the second thrust bearing 234 of FIG. 5 is similar to the first thrust bearing 232 of FIG. 4. However, the elements of the second thrust bearing 234 are designed to support or counteract the forward thrust as opposed to the aft thrust. As such, when the control system 260 determines that the aft thrust satisfies the upper threshold, the control system 260 can decrease, using the first pressure control valve 258, the pressure in the second flowline 256, which increases the pressure in the first flowline 254. Further, when the control system 260 determines that the aft thrust no longer satisfies the lower threshold, the control system 260 can use the first pressure control valve 258 to increase the pressure in the second flowline 256. Additionally or alternatively, the control system 260 can use the third pressure control valve 522 to decrease the pressure in the sixth flowline 516 when the aft thrust satisfies the upper threshold and/or increase the pressure in the sixth flowline 516 when the aft thrust does not satisfy the lower threshold.

The dual thrust bearing system 250 as described above improves thrust balance of the shaft 226 while reducing (e.g., inhibiting, preventing, etc.) thrust crossover from aft thrust to forward thrust. However, in some examples, the dual thrust bearing system 250 is configured to improve the thrust balance on the shaft 226 while inhibiting thrust crossover from the forward thrust to the aft thrust. In such examples, the first pressure control valve 258 can be fluidly coupled to the first flowline 254 rather than the second flowline 256. Further, in such examples, when the control system 260 determines that the forward thrust satisfies the upper threshold, the control system 260 can decrease, using the first pressure control valve 258, the pressure in the first flowline 254, which increases the pressure in the second flowline 256. In such examples, when the control system 260 determines that the forward thrust no longer satisfies the lower threshold, the control system 260 can use the first pressure control valve 258 to increase the pressure in the first flowline 254. Additionally or alternatively, the control system 260 can use the third pressure control valve 522 to increase the pressure in the sixth flowline 516 when the forward thrust satisfies the upper threshold and/or decrease the pressure in the sixth flowline 516 when the forward thrust does not satisfy the lower threshold.

Figure 6:
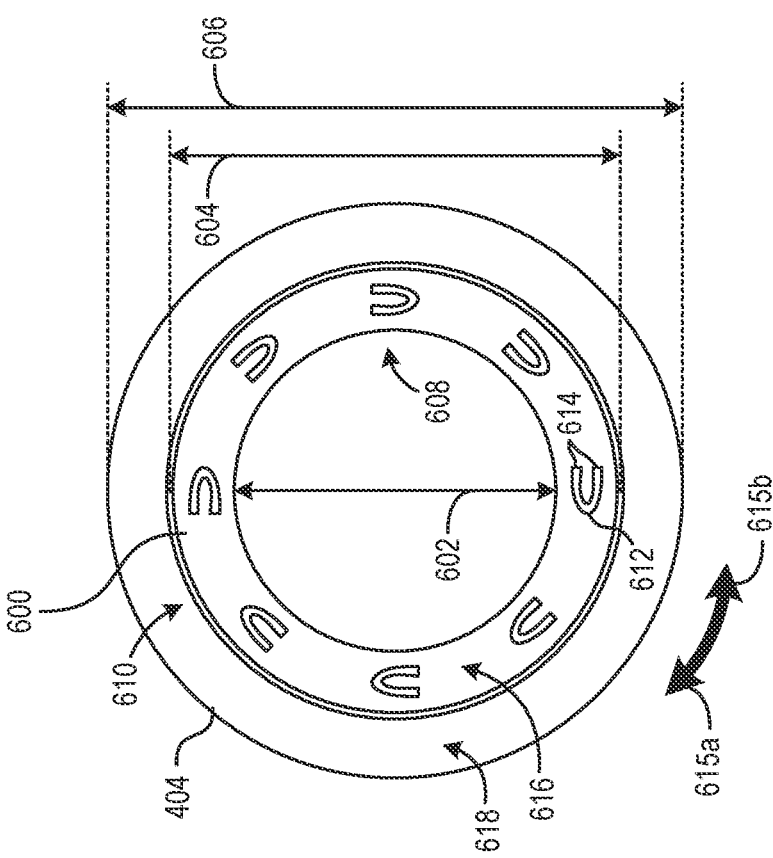
FIG. 6 is a front view of an example first thrust pad that can be implemented in the first and/or second thrust bearings of FIGS. 4 and/or 5.

FIG. 6 is front view of an example first thrust pad 600 that may be implemented in the first and/or second thrust bearings 232, 234 of FIGS. 4 and/or 5. As such, the first thrust pad 600 can be implemented as the second and/or fourth thrust pads 410, 510 of FIGS. 4 and/or 5. In the illustrated example of FIG. 6, the first thrust pad 600 is implemented in the first thrust bearing 232 of FIG. 4. The first thrust pad 600 is coupled to the first wall 404 of the first bearing housing 402 of FIG. 4. The first thrust pad 600 can be mechanically coupled (e.g., using bolts, pins, clamps, welding, etc.) and/or chemically coupled (e.g., using adhesives, epoxy, etc.) to the first wall 404.

As shown in FIG. 6, the first thrust pad 600 has a first inner diameter 602 and a first outer diameter 604. Furthermore, the first wall 404 has an outer diameter 606 greater than the first outer diameter 604. In some examples, the first wall 404 has an inner diameter that corresponds to the first inner diameter 602 of the first thrust pad 600. The first thrust pad 600 includes a first plurality of serrations 608 (e.g., grooves, notches, indentations, etc.) circumferentially arranged in a first pattern 610 along the first thrust pad 600. The first plurality of serrations 608 improve the load carrying capability of the first thrust pad 600. The first plurality of serrations 608 are hydrodynamic features (e.g., grooves, etc.) that increases the volume of the working fluid in the bearing housing (e.g., the first bearing housing 402). As such, the pressurized film of the working fluid on the first thrust pad 600 is thicker, which increases the thrust carrying capacity of a thrust bearing (e.g., the first thrust bearing 232, etc.). Furthermore, the increased volume of the working fluid in the bearing housing reduces wear of the thrust bearing.

In the illustrated example of FIG. 6, the first pattern 610 of the first plurality of serrations 608 corresponds to a plurality of (e.g., eight, etc.) U-shaped serrations having a rounded end 612 and a pair of arms 614. The first pattern 610 includes the first plurality of serrations 608 circumferentially spaced (e.g., evenly, unevenly, etc.) along the first thrust pad 600. The first pattern 610 includes the rounded end 612 positioned forward of the pair of arms 614 relative to a first rotational direction 615a (e.g., clockwise direction). That is, the first plurality of serrations 608 are oriented in the first rotational direction. In the illustrated example of FIG. 6, the first wall 404 and the first thrust pad 600 are stationary. Thus, when the first thrust pad 600 is implemented in the first thrust bearing 232 of FIG. 4, the first thrust disk 236 rotates in a second rotational direction 615b (e.g., counter clockwise) relative to the front view of the first thrust pad 600 shown in FIG. 6.

The first pattern 610 of the first plurality of serrations 608 may include another suitable number of (e.g., six, 10, 20, etc.) serrations, another suitable shape (or configuration), and/or another suitable arrangement based on a desired load carrying capability and/or wear reducing capability of the first thrust pad 600. For example, the plurality of serrations 608 may be W-shaped with a trio of trailing arms, triangular with a pointed tip positioned forward of two trailing tips, oval-shaped, rectangular, etc. Additionally or alternatively, the first pattern 610 can have the plurality of serrations 608 circumferentially spaced at variable distances along the first thrust pad 600. Some other example thrust pads having alternative configurations of serrations and alternative patterns (or arrangements) thereof are described further below in connection with FIGS. 8-10.

Figure 7:
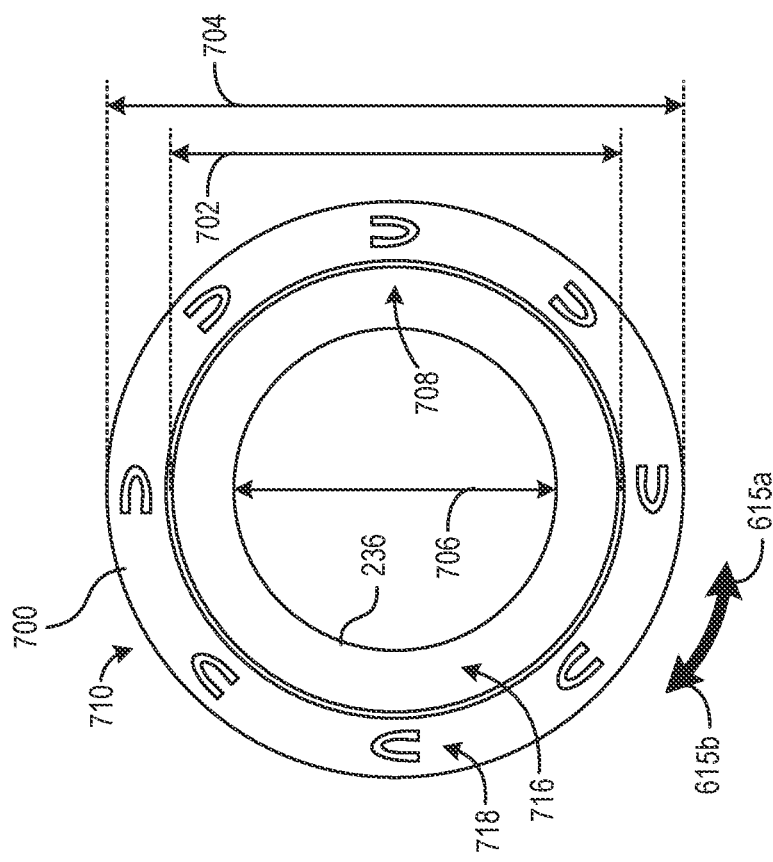
FIG. 7 is a rear view of an example second thrust pad that can be implemented in the first and/or second thrust bearings of FIGS. 4 and/or 5.

FIG. 7 is a rear view of an example second thrust pad 700 that may be implemented in the first and/or second thrust bearings 232, 234 of FIGS. 4 and/or 5. As such, the second thrust pad 700 can be implemented as the first and/or third thrust pads 408, 508 of FIGS. 4 and/or 5. In the illustrated example of FIG. 7, the second thrust pad 700 is implemented in the first thrust bearing 232 of FIG. 4. The second thrust pad 700 is coupled to the first thrust disk 236. The second thrust pad 700 can be mechanically coupled and/or chemically coupled to the first thrust disk 236.

As shown in FIG. 7, the second thrust pad 700 has a second inner diameter 702 and a second outer diameter 704. Furthermore, the first thrust disk 236 has an inner diameter 706 less than the second inner diameter 702. In some examples, the inner diameter 706 corresponds to a diameter of the shaft 226 of FIGS. 2 and 4. In some examples, the first thrust disk 236 has an outer diameter that corresponds to the second outer diameter 704 of the second thrust pad 700. The second thrust pad 700 includes a second plurality of serrations 708 circumferentially arranged in a second pattern 710 along the second thrust pad 700. In the illustrated example, the second plurality of serrations 708 are similar to the first plurality of serrations 608, and the second pattern 710 is similar to the first pattern 610. However, in some examples, the second plurality of serrations 708 and the second pattern 710 correspond to another number, configuration, and/or arrangement of serrations mentioned above.

Referring to FIGS. 6 and 7, the first and second thrust pads 600, 700 can be implemented in the first thrust bearing 232 to provide a certain aft thrust carrying capacity for the TTB pump 200. Similarly, the first and second thrust pads 600, 700 can be implemented in the second thrust bearing 234 to provide a certain forward thrust carrying capacity for the TTB pump 200. In the illustrated examples, the first wall 404 includes a first inner radial portion 616 and a first outer radial portion 618, and the first thrust disk includes a second inner radial portion 716 and a second outer radial portion 718. When the first thrust pad 600 is positioned in the first inner radial portion 616 and the second thrust pad 700 is positioned in the second outer portion 718, the first thrust bearing 232 is considered to provide a "high thrust carrying capacity." It should be appreciated that the hydrodynamic pressure on the second thrust pad 700 applies a moment force to the first thrust disk 236 having a moment arm defined by a radius of the second thrust pad 700 (e.g., half of the second inner diameter 702 or the second outer diameter 704). Thus, the farther the second thrust pad 700 is away from the shaft 226, the more thrust carrying capacity the first thrust bearing 232 can provide. Alternatively, when the second thrust pad 700 is positioned on the second inner radial portion 716 of the first thrust disk 236 and the first thrust pad 600 is positioned on the first outer radial portion 618 of the first wall 404, the first thrust bearing 232 is considered to provide a "low thrust carrying capacity." As such, the first and second thrust bearings 232, 234 can provide multiple combinations of high and/or low thrust capacity based on the positions of the first thrust pad 600, the second thrust pad 700, and other example thrust pads disclosed below. For example, the first thrust bearing 232 can be configured to provide a high thrust carrying capacity and the second thrust bearing 234 can be configured to provide a low thrust carrying capacity when the TTB pump 200 of FIG. 2 is intended to operate with some amount of aft thrust acting on the shaft 226.

In some examples, the values of the first inner diameter 602, the first outer diameter 604, the second inner diameter 702, and the fourth outer diameter 704 can be adjusted to change a certain load carrying capacity for the first and/or second thrust bearings 232, 234 of FIGS. 4 and/or 5. For example, second inner diameter 702 and the first outer diameter 604 can be decreased to increase the load carrying capacity of the first thrust bearing 232. In other words, an area of the second thrust pad 700 can be increased to increase the thrust carrying capacity of the first thrust bearing 232. In turn, the upper threshold and the lower threshold can be determined based on the load carrying capacities of the thrust bearings (e.g., the first thrust bearing 232, the second thrust bearing 234, etc.) and/or the areas of the first inner radial portion 616, the first outer radial portion 618, the second inner radial portion 716, and the second outer radial portion 718. In the illustrated examples, it should be noted that the second inner diameter 702 of the second thrust pad 700 is greater than the first outer diameter 604 of the first thrust pad 600 such that the first and second thrust pads 600, 700 do not overlap.

FIG. 8 is a front view of an example third thrust pad 800 that can be implemented in the first and/or second thrust bearings 232, 234 of FIGS. 4 and/or 5. The third thrust pad 800 can be implemented as any one of the first, second, third, or fourth thrust pads 408, 410, 508, or 510 of FIG. 4 or 5. In the illustrated example, the second thrust pad includes an inner radial portion 802 and an outer radial portion 804 different than the inner radial portion 802. The third thrust pad 800 includes a plurality of serrations 806 circumferentially arranged in a third pattern 808 along the inner radial portion 802. In some examples, the plurality of serrations 806 are circumferentially arranged along the outer radial portion 804.

The third thrust pad 800 of FIG. 8 can be similar to the first thrust pad 600 and/or the second thrust pad 700 of FIGS. 6 and/or 7. More specifically, the third thrust pad 800 can have dimensions (e.g., diameters) that correspond to like dimensions (e.g., diameters 602, 604, 702, and/or 704) of the thrust pads depicted in FIGS. 6 and/or 7. In some examples, dimensions of the third thrust pad 800 are different (e.g., greater or less) than those of the first and/or second thrust pad(s) 600 and/or 700. For example, the inner radial portion 802 can have a larger surface area than the first thrust pad 600.

In the illustrated example, the third pattern 808 of the third thrust pad 800 is different than the first pattern 610 and the second pattern 710. The third pattern 808 includes a fan of serrations that are consecutively arranged and that spiral outward from an inner circumference 820. In other words, the serrations 806 extend radially outward from the inner circumference 820 and bend circumferentially in the first rotational direction 615a. As such, the second rotational direction 615b depicts the direction of travel of the third thrust pad 800 when the third thrust pad 800 is implemented as the first or third thrust pads 408, 508. However, when the third thrust pad 800 is implemented as the second or fourth thrust pad 410, 510, the first rotational direction 615a depicts the direction of travel of the first or second thrust disk 236, 238, respectively, relative to the third thrust pad 800, which is stationary in such an example.

FIG. 9 is a front view of an example fourth thrust pad 900 that can be implemented in the first and/or second thrust bearings 232, 234 of FIGS. 4 and/or 5. The fourth thrust pad 900 can be implemented as any one of the first, second, third, or fourth thrust pads 408, 410, 508, or 510 of FIG. 4 or 5. In the illustrated example, the fourth thrust pad 900 includes an inner radial portion 902 and an outer radial portion 904 different than the inner radial portion 902. The fourth thrust pad 900 includes a plurality of serrations 906, a first plurality of through holes 907A, and a second plurality of through holes 907B circumferentially arranged in a fourth pattern 908 along the fourth thrust pad 900. In the illustrated example, the plurality of serrations 906 and the first plurality of through holes 907A are circumferentially arranged along the inner radial portion 902 and the second plurality of through holes 907B are circumferentially arranged along the outer radial portion 904. In some examples, the fourth pattern 908 includes the second plurality of through holes 907B circumferentially arranged along the inner radial portion 902 and the plurality of serrations 906 and the first plurality of through holes 907A circumferentially arranged along the outer radial portion 904.

The fourth thrust pad 900 of FIG. 9 can be similar to the first thrust pad 600 and/or the second thrust pad 700 of FIGS. 6 and/or 7. More specifically, the fourth thrust pad 900 can have dimensions (e.g., diameters) that correspond to like dimensions of the thrust pads depicted in FIGS. 6 and/or 7. In some examples, dimensions of the third thrust pad 800 are different than those of the first and/or second thrust pad(s) 600 and/or 700. For example, the inner radial portion 902 can have a larger surface area than the first thrust pad 600.

In the illustrated example of FIG. 9, the fourth pattern 908 of the fourth thrust pad 900 is different than the first pattern 610, the second pattern 710, and the third pattern 808. The fourth pattern 908 includes a sequence of two arrow-shaped serrations and one through hole. The sequences are consecutively repeated and circumferentially arranged along the fourth thrust pad 900 at corresponding radial positions. Furthermore, the fourth pattern 908 includes the second plurality of through holes 907B consecutively arranged along the fourth thrust pad 900 and concentric to the first plurality of through holes 907A. As such, the plurality of serrations 906, the first plurality of through holes 907A, and the second plurality of through holes 907B define the fourth pattern 908. As shown in FIG. 9, the plurality of serrations 906 (arrows) point in the first rotational direction 615a. However, the plurality of serrations 906 can also point in the second rotational direction 615b based on the rotational direction of the thrust disks 236, 238 and/or the component (e.g., the first thrust disk 236 or the first wall 404) to which the fourth thrust pad 900 is coupled.

FIG. 10 is a front view of an example fifth thrust pad 1000 that can be implemented in the first and/or second thrust bearings 232, 234 of FIGS. 4 and/or 5. The fifth thrust pad 1000 can be implemented as any one of the first, second, third, or fourth thrust pads 408, 410, 508, or 510 of FIG. 4 or 5. In the illustrated example, the fifth thrust pad 1000 includes an inner radial portion 1002 and an outer radial portion 1004 different than the inner radial portion 1002. The fifth thrust pad 1000 includes a plurality of serrations 1006, a first plurality of through holes 1007A, and a second plurality of through holes 1007B circumferentially arranged in a fifth pattern 1008 along the fifth thrust pad 1000. The fifth thrust pad 1000 can be similar to the fourth thrust pad 900 of FIG. 9. For example, the dimensions of the fifth thrust pad 1000 can be the same as like dimensions of the fourth thrust pad 900. Additionally, the fifth pattern 1008 can correspond to the fourth pattern 908. However, in the illustrated example, the fifth pattern 1008 includes a sequence of two bow-shaped serrations and one through hole, as opposed to the two arrow-shaped serrations of FIG. 9. In the illustrated example, the plurality of serrations 1006 (bows) point in the second rotational direction 615b. However, the plurality of serrations 1006 can also point in the first rotational direction 615a based on the rotational direction of the thrust disks 236, 238 and/or the component (e.g., the first thrust disk 236 or the first wall 404) to which the fifth thrust pad 1000 is coupled.

Referring to FIGS. 6-10, in some examples, the fourth and fifth thrust pads 900, 1000 provide improved thrust support to the thrust bearings 232, 234 due to the combination of the plurality of serrations 906, 1006 and the through holes 907A, 907B, 1007A, 1007B. However, the fourth and fifth thrust pads 900, 1000 may incur greater manufacturing cost and complexity. In some examples, the third thrust pad 800 provides lower thrust support due to the hydrodynamic features (the plurality of serrations 806) but is less complex to manufacture. Furthermore, in some examples, the first and second thrust pads 600, 700 include hydrodynamic features (the first and second pluralities of serrations 608, 708) that provide more thrust support than the third thrust pad 800, but less thrust support than the fourth and fifth thrust pads 900, 1000. As such, the cost associated with the first and second thrust pads 600, 700 follows in accordance with the thrust support benefits.

The TTB pump 200 can include any combination of the first, second, third, fourth, or fifth thrust pads 600, 700, 800, 900, or 1000 based on the desired thrust load capacity of the first and second thrust bearings 232, 234. For example, the third thrust pad 800 can be implemented as the first thrust pad 408 and the fourth thrust pad 900 can be implemented as the second thrust pad 410 of the first thrust bearing 232 of FIG. 4. As such, the upper threshold and the lower threshold can be adjusted based on which ones of the thrust pads 600, 700, 800, 900, 1000 are used in the TTB pump 200. Furthermore, the upper threshold and the lower threshold can be adjusted based on whether respective ones of the thrust pads 600, 700, 800, 900, 1000 are positioned in the first inner/outer radial portions 616, 618 of the thrust disks 236, 238 or the second inner/outer radial portions 716, 718 of the bearing housings 402, 502.

Figure 11:
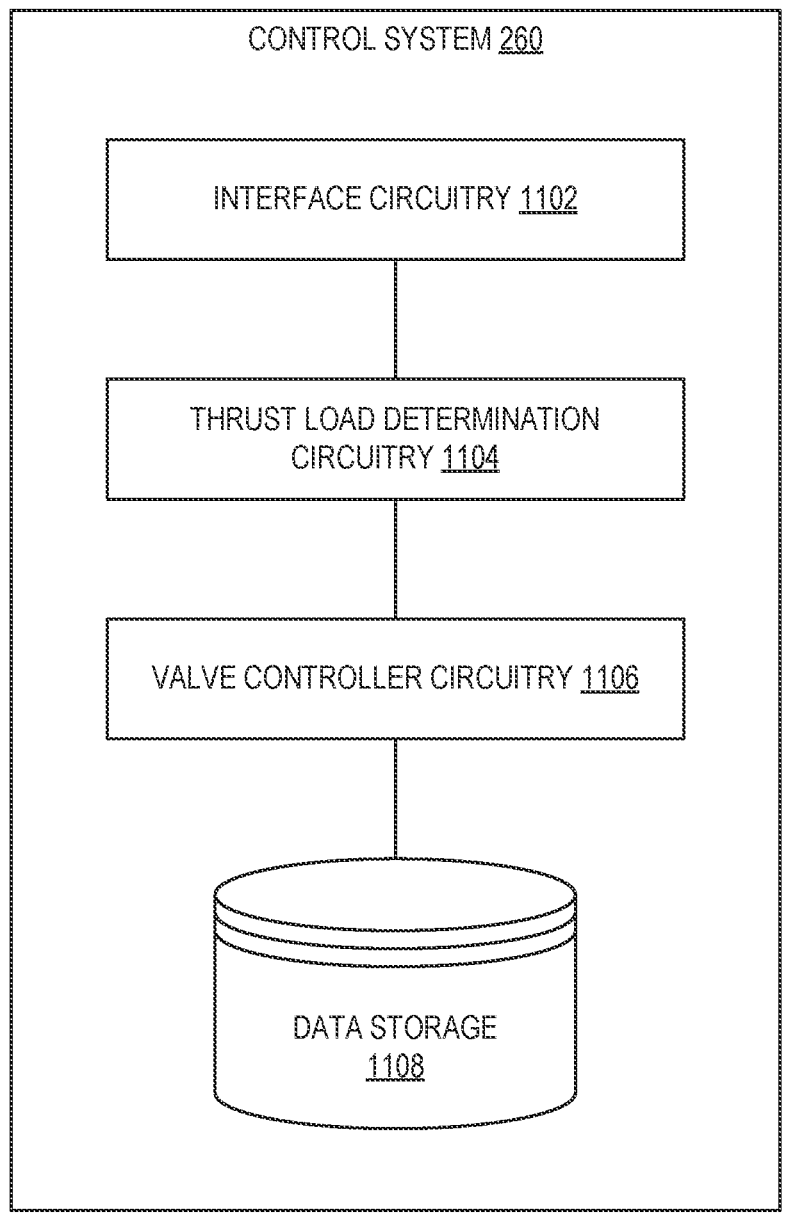
FIG. 11 is a block diagram of an example control system used in the example thermal transport bus pump of FIG. 2.

FIG. 11 is a block diagram of the control system 260 to balance thrust loads acting on the shaft 226 and to inhibit (e.g., eliminate, etc.) a thrust crossover from aft thrust to forward thrust. Thus, the control system 260 can ensure that some amount of aft thrust acts on the shaft 226. In some examples, the control system 260 is configured to inhibit a thrust crossover from forward thrust to aft thrust and to ensure that some amount of forward thrust acts on the shaft 226. More specifically, the control system 260 can adjusts the pressure in the first, second, third, fourth, fifth, and/or sixth flowlines 254, 256, 414, 416, 514, and/or 516 of FIGS. 2, 4, and/or 5 based on the forward thrust and/or aft thrust as well as the upper threshold and the lower threshold.

The control system 260 of the illustrated example of FIG. 11 includes example interface circuitry 1102, example thrust load determination circuitry 1104, example valve controller circuitry 1106, and example data storage 1108. The control system 260 of FIGS. 2, 4, 5, and 11 may be instantiated (e.g., creating an instance of, bring into being for any length of time, materialize, implement, etc.) by processor circuitry such as a central processing unit executing instructions. Additionally or alternatively, the control system 260 of FIGS. 2, 4, 5, and 11 may be instantiated (e.g., creating an instance of, bring into being for any length of time, materialize, implement, etc.) by application specific integrated circuit(s) (ASIC(s)) or Field Programmable Gate Array(s) (FPGA(s)) structured to perform operations corresponding to the instructions. It should be understood that some or all of the circuitry of FIG. 11 may, thus, be instantiated at the same or different times. Some or all of the circuitry may be instantiated, for example, in one or more threads executing concurrently on hardware and/or in series on hardware.

Moreover, in some examples, some or all of the circuitry of FIG. 11 may be implemented by microprocessor circuitry executing instructions to implement one or more virtual machines and/or containers.

The control system 260 includes the interface circuitry 1102 to synchronize operation between input/output device(s) and circuitry (e.g., processor circuitry) of the control system 260. In some examples, the interface circuitry 1102 is instantiated by processor circuitry executing interface instructions and/or configured to perform operations such as those represented by the flowchart of FIG. 12. In some examples, the aircraft in which the TTB pump 200 is implemented includes the input device(s) (e.g., switch(es), dial(s), button(s), knob(s), keyboard(s), touchpad(s), etc.) in a cockpit or another control center onboard. Using such input device(s), the operator can cause the TTB pump 200 to start or stop pumping the working fluid through an associated thermal transport bus. For example, when the aircraft has landed or is preparing to cease operation, the pilot can provide an input to the control system 260 indicating that the TTB pump 200 to stop pumping. In such an example, the interface circuitry 1102 can generate and/or direct a signal to other circuitry of the control system 260, which can cause the motor 210 to stop powering the TTB pump 200.

The control system 260 includes the thrust load determination circuitry 1104 to obtain data (e.g., thrust load measurements) from the load cell 262 and to detect the aft thrust acting on the shaft 226. The thrust load determination circuitry 1104 can also determine whether the aft thrust satisfies the upper threshold or the lower threshold. In some examples, the thrust load determination circuitry 1104 performs similar operations corresponding to the forward thrust based on configuration(s) of the TTB pump 200. In some examples, the thrust load determination circuitry 1104 is instantiated by processor circuitry executing thrust load determination instructions and/or configured to perform operations such as those represented by the flowchart of FIG. 12. The thrust load determination circuitry 1104 can function as a closed loop controller that obtains input feedback (e.g., thrust load of the shaft 226) from the load cell 262 and sends output data (e.g., output pressure of the pressure control valve 258) to the valve controller circuitry 1106 of the control system 260. For example, at predetermined intervals (e.g., 1 second (s), 5 seconds, 10 seconds, etc.) the thrust load determination circuitry 1104 can query the load cell 262 to detect the current (most up to date) thrust load of the shaft 226. The thrust load determination circuitry 1104 compares (e.g., calculates a difference between) the aft thrust of the shaft 226 to the upper threshold and the lower threshold to determine whether the aft thrust satisfies (e.g., matches or exceeds) the upper or lower threshold. When the thrust load determination circuitry 1104 determines, processes, and/or verifies that the aft thrust satisfies the upper threshold, the thrust load determination circuitry 1104 can send a signal to the valve controller circuitry 1106 to increase the pressure output of the pressure control valve 258 to the first flowline 254, which increases thrust support of the first thrust bearing 232 and balances the thrust load in the TTB pump 200. Alternatively, when the thrust load determination circuitry 1104 determines that the aft thrust no longer satisfies the lower threshold, the thrust load determination circuitry 1104 can send a signal to the valve controller circuitry 1106 to increase the pressure output of the pressure control valve 258 to the second flowline 254, which increases thrust support of the second thrust bearing 234 and prevents a thrust crossover.

Additionally or alternatively, the thrust load determination circuitry 1104 can increase or decrease the pressure outputs of the second pressure control valve 422 and/or the third pressure control valve 522 based on the aft thrust on the shaft 226. For example, when the thrust load determination circuitry 1104 determines that the aft thrust is within a lower portion of a threshold range (e.g., closer to the lower threshold) the thrust load determination circuitry 1104 can increase the pressure output of the third pressure control valve 522 and/or decrease the pressure output of the second pressure control valve 422 to gradually (or incrementally) increase the aft thrust on the shaft 226.

The control system 260 of the example of FIG. 11 includes the valve controller circuitry 1106 to adjust the pressure in the first, second, third, fourth, fifth, and/or sixth flowlines 254, 256, 414, 416, 514, and/or 516 based on the aft thrust. More specifically, the valve controller circuitry 1106 receives signals indicating a desired valve position and/or a desired output pressure from the thrust load determination circuitry 1104, determine a current state of the pressure control valves 258, 422, 522, and cause the position of the pressure control valves 258, 422, 522 to change based on the received signals and the current positions. In some examples, the valve controller circuitry 1106 is instantiated by processor circuitry executing valve controller instructions and/or configured to perform operations such as those represented by the flowchart of FIG. 12. In some examples, the valve controller circuitry 1106 is configured as a closed loop controller that receives positional feedback and/or output pressure feedback from the pressure control valves 258, 422, 522 and continues to send output signals that cause actuation of a stopper (e.g., plunger, gate, ball, globe, etc.) until the valve controller circuitry 1106 determines that the output pressure is set to the proper value and/or the stopper is at the proper position.

The control system 260 includes the data storage 1108 to store data (e.g., thrust measurements, thresholds, current operating conditions, etc.) or any information associated with the interface circuitry 1102, the thrust load determination circuitry 1104, and/or the valve controller circuitry 1106. The example data storage 1108 of the illustrated example of FIG. 11 can be implemented by any memory, storage device and/or storage disc for storing data, such as flash memory, magnetic media, optical media, etc. Furthermore, the data stored in the example data storage 1108 can be in any data format such as binary data, comma delimited data, tab delimited data, structured query language (SQL) structures, image data, etc.

While an example manner of implementing the control system 260 of FIGS. 2, 4, and 5 is illustrated in FIG. 11, one or more of the elements, processes, and/or devices illustrated in FIG. 11 may be combined, divided, re-arranged, omitted, eliminated, and/or implemented in another way. Further, the example interface circuitry 1102, the example thrust load determination circuitry 1104, the example valve controller circuitry 1106, and/or, more generally, the example control system 260 of FIGS. 2, 4, and 5, may be implemented by hardware alone or by hardware in combination with software and/or firmware. Thus, for example, any of the example interface circuitry 1102, the example thrust load determination circuitry 1104, the example valve controller circuitry 1106, and/or, more generally, the example control system 260, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s)

(PLD(s)), and/or field programmable logic device(s) (FPLD(s)) such as FPGA(s). Further still, the example control system 260 of FIGS. 2, 4, and 5 may include one or more elements, processes, and/or devices in addition to, or instead of, those illustrated in FIG. 8, and/or may include more than one of any or all of the illustrated elements, processes, and devices.

Figure 12:
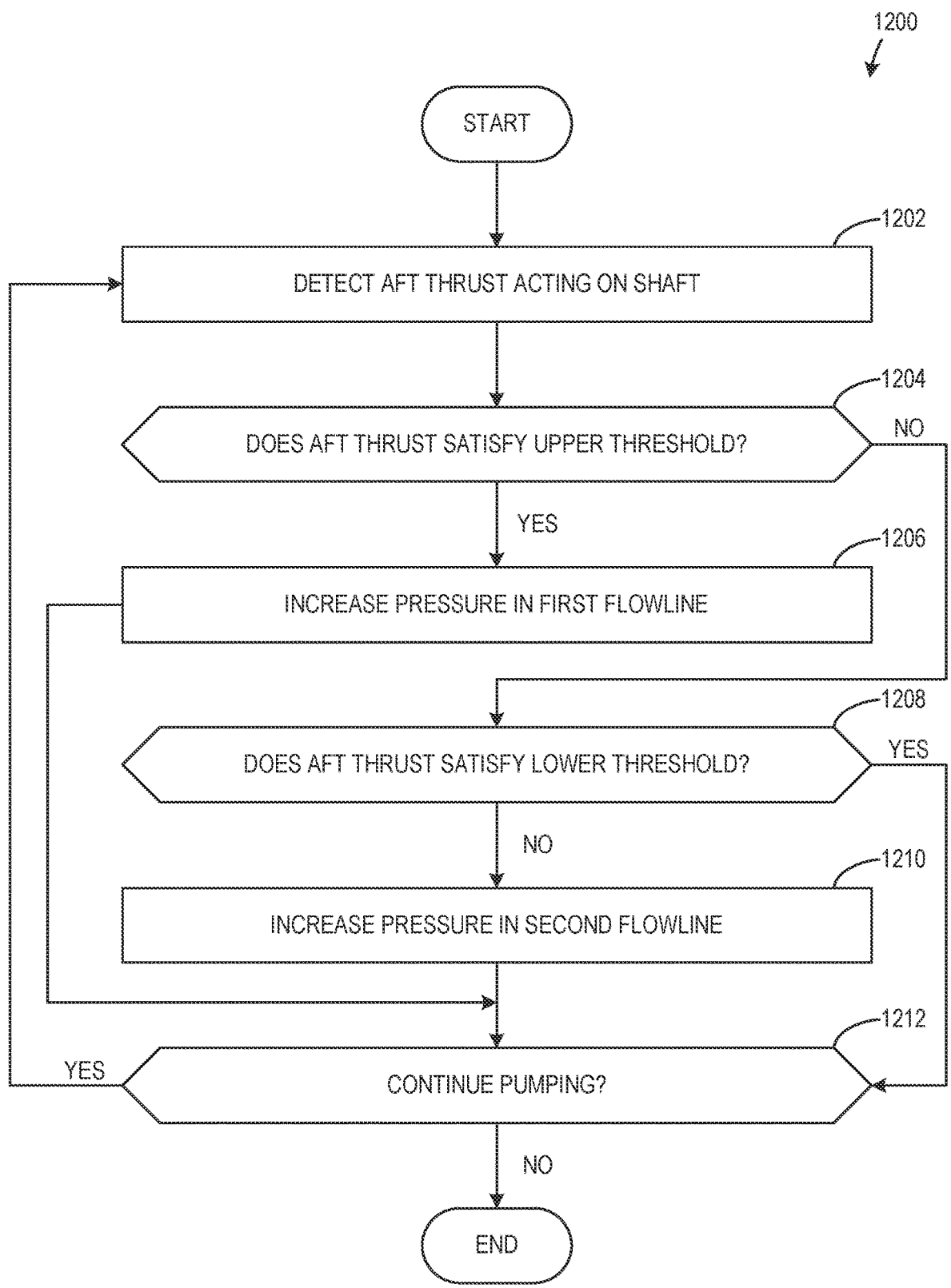
FIG. 12 is a flowchart representative of example machine readable instructions and/or example operations that can be executed by example processor circuitry to implement the example control system of FIG. 11.

A flowchart representative of example machine readable instructions, which may be executed to configure and/or cause processor circuitry to implement the control system 260 of FIGS. 2, 4, and 5, is shown in FIG. 12. The machine readable instructions may be one or more executable programs or portion(s) of an executable program for execution by processor circuitry, such as processor circuitry 1312 shown in an example processor platform 1300 discussed below in connection with FIG. 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 12, many other methods of implementing the example control system 260 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 12 may be implemented using executable instructions (e.g., computer and/or machine readable instructions) stored on at least one non-transitory computer and/or machine readable media and/or medium such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 12 is a flowchart representative of example machine readable instructions and/or example operations 1200 that may be executed and/or instantiated by processor circuitry to balance the thrust load on the shaft 226 and to inhibit thrust crossover from occurring. The machine readable instructions and/or the operations 1200 of FIG. 12 help ensure that some amount (e.g., greater than or equal to the lower threshold) of aft thrust acts on the shaft 226 without crossing over to forward thrust. However, in some examples, the machine readable instructions and/or the operations 1200 of FIG. 12 are implemented to ensure some amount of forward thrust acts on the shaft 226 without crossing over to aft thrust. The machine readable instructions and/or the operations 1200 of FIG. 12 begin at block 1202, at which the control system 260 detects the amount of aft thrust acting on the shaft 226. For example, the thrust load determination circuitry 1104 can query the interface circuitry 1102 or the load cell 262 regarding a current value of the thrust loading on the shaft 226. For example, the thrust load determination circuitry 1104 may detect, using the load cell 262, that there is an aft thrust of 500 pounds-force (lbf) acting on the shaft 226.

At block 1204, the control system 260 determines whether the aft thrust satisfies the upper threshold. For example, the thrust load determination circuitry 1104 determines whether the aft thrust exceeds the upper threshold. When the thrust load determination circuitry 1104 determines that the aft thrust satisfies the upper threshold, the example operations 1200 proceed to block 1206. When the thrust load determination circuitry 1104 determines that the aft thrust does not satisfy the upper threshold, the example operations 1200 proceed to block 1208. For example, the upper threshold may be 450 lbf, in which case, the thrust load determination circuitry 1104 determines that the aft thrust (500 lbf) satisfies the upper threshold, and the operations 1200 proceed to block 1206. In another example, the upper threshold may be 600 lbf, in which case, the operations 1200 proceed to block 1208 because the thrust load determination circuitry 1104 determines that the aft thrust does not satisfy the upper threshold.

At block 1206, the control system 260 increases the pressure in the first flowline 254. For example, the valve controller circuitry 1106 can send an electrical command signal to the pressure control valve 258 to cause mechanism(s) (e.g., stopper, actuator, diaphragm, solenoid, etc.) therein to increase the pressure in the first flowline 254. Additionally or alternatively, the valve controller circuitry 1106 can increase the pressure output of the second pressure control valve 422 and/or decrease the pressure output of the third pressure control valve 522. For example, the valve controller circuitry 1106 can increase an effective output area of the pressure control valve 258 leading to the first flowline 254 to increase the pressure therein and, thus, reduce the aft thrust (e.g., from 500 lbf to 400 lbf). Following the operations of block 1206, the operations 1200 proceed to block 1212.

At block 1208, the control system 260 determines whether the aft thrust satisfies the lower threshold. For example, the thrust load determination circuitry 1104 determines whether the aft thrust exceeds the upper threshold. When the thrust load determination circuitry 1104 determines that the aft thrust satisfies the lower threshold, the example operations 1200 proceed to block 1212. When the thrust load determination circuitry 1104 determines that the aft thrust does not satisfy the upper threshold, the example operations 1200 proceed to block 1210. For example, in block 1202, the thrust load determination circuitry 1104 may detect, using the load cell 262, that there is an aft thrust of 50 lbf acting on the shaft 226. Furthermore, the lower threshold may be 100 lbf, in which case, the thrust load determination circuitry 1104 determines that the aft thrust (50 lbf) does not satisfy the lower threshold, and the operations 1200 proceed to block 1210. In another example, the lower threshold may be 30 lbf, in which case, the operations 1200 proceed to block 1212 because the thrust load determination circuitry 1104 determines that the aft thrust does satisfy the lower threshold.

At block 1210, the control system 260 increases the pressure in the second flowline 256. For example, the valve controller circuitry 1106 can send an electrical command signal to the pressure control valve 258 to cause the mechanism(s) therein to increase the pressure in the second flowline 256. Additionally or alternatively, the valve controller circuitry 1106 can decrease the pressure output of the second pressure control valve 422 and/or increase the pressure output of the third pressure control valve 522. For example, the valve controller circuitry 1106 can increase an effective output area of the pressure control valve 258 leading to the second flowline 256 to increase the pressure therein and, thus, increase the aft thrust (e.g., from 50 lbf to 150 lbf). Following the operations of block 1206, the operations 1200 proceed to block 1212.

At block 1212, the control system 260 determines whether the TTB pump 200 is to continue pumping the working fluid (e.g., sCO2, liquid helium, helium-xenon, etc.). For example, the interface circuitry 1102 can detect whether an input signal was received via the input device(s) mentioned previously. The input signal is a command from an operator indicating that the TTB pump 200 is to cease the pressurization of the working fluid. When the interface circuitry 1102 determines that the TTB pump 200 is to continue pumping, the operations 1200 return to block 1202. When the interface circuitry 1102 determines that the TTB pump 200 is not to continue pumping, the operations 1200 end.

Figure 13:
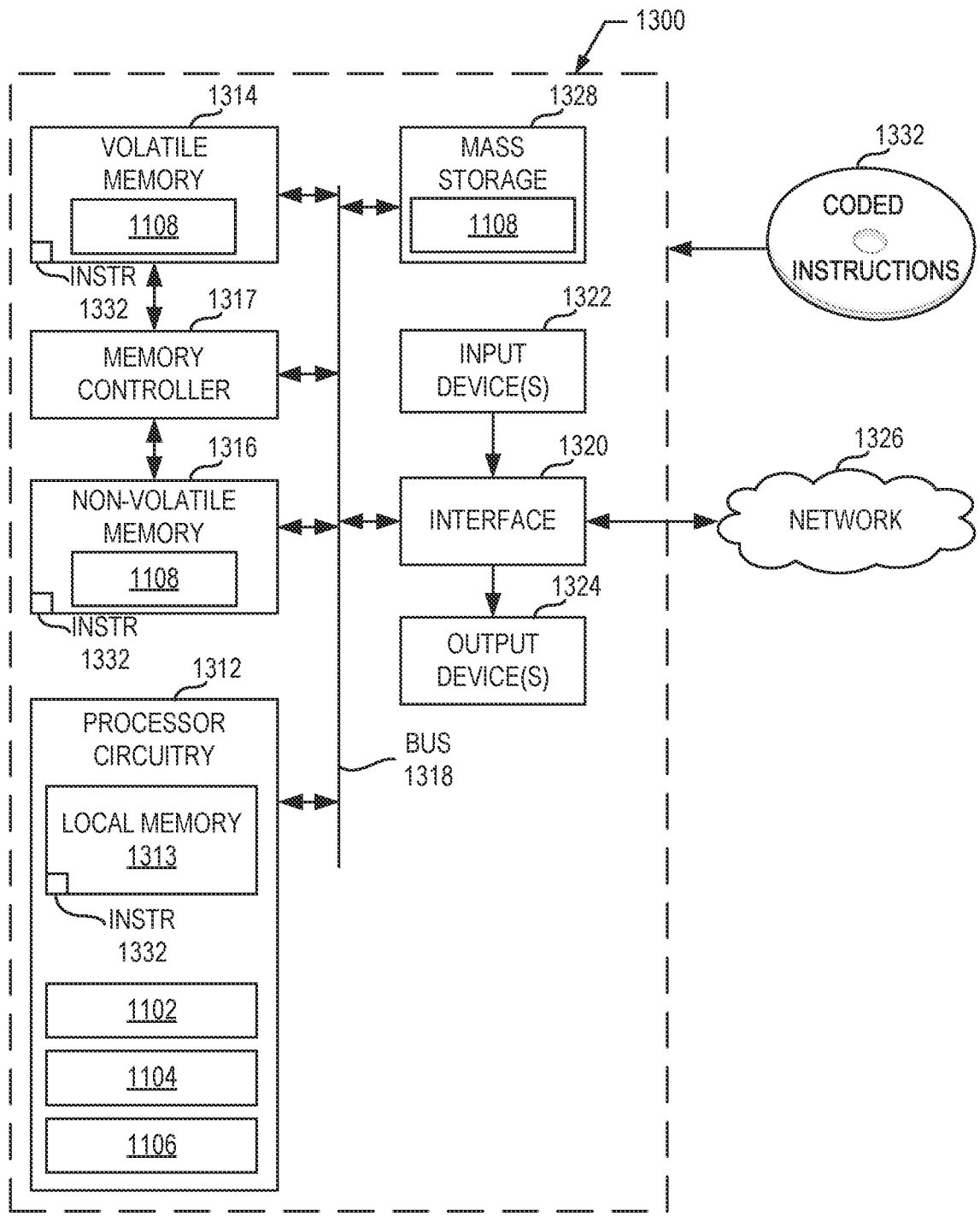
FIG. 13 is a block diagram of an example processing platform including processor circuitry structured to execute the example machine readable instructions and/or the example operations of FIG. 12 to implement the example control system of FIG. 11.

FIG. 13 is a block diagram of an example processor platform 1300 structured to execute and/or instantiate the machine readable instructions and/or the operations of FIG. 12 to implement the control system 260 of FIGS. 2, 4, and 5. The processor platform 1300 can be, for example, a personal computer, a workstation, a self-learning machine (e.g., a neural network), a mobile device (e.g., a cell phone, a smart phone, a tablet such as an iPad™), a headset (e.g., an augmented reality (AR) headset, a virtual reality (VR) headset, etc.) or other wearable device, a full authority digital engine (or electronics) control (FADEC), an avionics system, or another type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example interface circuitry 1102, the example thrust load determination circuitry 1104, the example valve controller circuitry 1106, and/or, more generally, the example control system 260.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, a keyboard, a button, a mouse, a touchscreen, a track-pad, a trackball, an isopoint device, and/or a control panel.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a control panel, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1332, which may be implemented by the machine readable instructions of FIG. 12, may be stored in the mass storage device 1328, in the volatile memory 1314, in the non-volatile memory 1316, and/or on a removable non-transitory computer readable storage medium such as a CD or DVD.

Example dual thrust bearing systems, apparatus, and methods for operating the same are disclosed herein. Disclosed dual thrust bearing systems improve thrust balance of a shaft of a TTB pump while reducing instances of thrust crossovers. Thrust bearing apparatus of example dual thrust bearing systems disclosed herein include a thrust disk extending radially from the shaft, a bearing housing surrounding the thrust disk, a first thrust pad coupled to a side of the thrust disk facing a wall of the bearing housing, and a second thrust pad coupled to the wall, wherein the first thrust pad does not overlap the second thrust pad. As disclosed herein, the first and second thrust pads include hydrodynamic features (e.g., serrations, grooves, etc.) in a circumferential pattern to increase the thrust carrying capacity of the thrust bearing. Furthermore, the first and second thrust pads include plane surfaces (e.g., flat portions) and serrated surfaces (e.g., grooved portions) to customize the thrust carrying capability of the corresponding thrust bearing.

Disclosed dual thrust bearing systems also include a control system communicatively coupled to a pressure control valve to adjust a first pressure in a first thrust bearing apparatus and a second pressure in a second thrust bearing apparatus based on a thrust load acting on the shaft of the TTB pump. As disclosed herein, the example control system adjusts the first or second pressure based on the thrust load satisfying an upper threshold or not satisfying a lower threshold. Such a configuration can ensure that some thrust acts on the shaft in a first direction without imposing excessive stress on the thrust disks/thrust bearings and without the thrust load crossing over to a second direction opposite the first direction (e.g., crossover from aft thrust to forward thrust). Thus, disclosed dual thrust bearing systems improve the thrust balance of the TTB pump while reducing the occurrence of thrust crossover, which reduces non-synchronous vibrations of the shaft and, thus, reduces wear and increases performance of the TTB pump.

Example methods, apparatus, systems, and articles of manufacture to balance thrust loads on a shaft of a TTB pump while inhibiting thrust crossover are disclosed herein. Further examples and combinations thereof include the following:

A thrust bearing apparatus to support thrust loading on a shaft of a pump, the thrust bearing apparatus comprising a thrust disk extending radially from the shaft, the thrust disk having a first side and a second side opposite the first side, a bearing housing surrounding the thrust disk and the shaft, the thrust disk disposed within the bearing housing, the bearing housing having a first wall facing the first side of the thrust disk and a second wall facing the second side of the thrust disk, a first thrust pad coupled to the first wall of the bearing housing, the first thrust pad including a first plurality of serrations circumferentially arranged in a first pattern along the first thrust pad, and a second thrust pad coupled to the first side of the thrust disk, the second thrust pad including a second plurality of serrations circumferentially arranged in a second pattern along the second thrust pad.

The thrust bearing apparatus of any preceding clause, wherein the first thrust pad has a first inner diameter and a first outer diameter, and the second thrust pad has a second inner diameter and a second outer diameter.

The thrust bearing apparatus of any preceding clause, wherein the first outer diameter is less than the second inner diameter.

The thrust bearing apparatus of any preceding clause, wherein the first wall includes a first inner radial portion and a first outer radial portion, the first thrust pad positioned on the first inner radial portion.

The thrust bearing apparatus of any preceding clause, wherein the thrust disk includes a second inner radial portion and a second outer radial portion, the second thrust pad positioned on the second outer radial portion, the first thrust pad to not overlap the second thrust pad.

The thrust bearing apparatus of any preceding clause, wherein the first pattern and the second pattern include a plurality of U-shaped serrations having a rounded end and a pair of arms.

The thrust bearing apparatus of any preceding clause, wherein at least one of the first pattern or the second pattern include a fan of serrations that spiral outward from an inner circumference of at least one of the first thrust pad or the second thrust pad.

The thrust bearing apparatus of any preceding clause, wherein at least one of the first pattern or the second pattern include a sequence of two arrow-shaped serrations and one through hole consecutively repeated along at least one of the first thrust pad or the second thrust pad.

The thrust bearing apparatus of any preceding clause, wherein at least one of the first pattern or the second pattern include a sequence of two bow-shaped serrations and one through hole consecutively repeated along at least one of the first thrust pad or the second thrust pad.

A dual thrust bearing system to support thrust loads on a shaft of a thermal transport bus pump, the dual thrust bearing system comprising a first thrust bearing including a first thrust disk extending radially from the shaft, the first thrust disk having a first side and a second side opposite the first side, a second thrust bearing including a second thrust disk extending radially from the shaft, the second thrust disk having a third side and a fourth side opposite the third side, and a secondary flowline fluidly coupled to a compressor collector of the thermal transport bus pump, the secondary flowline splitting into a first flowline and a second flowline, the first flowline fluidly coupled to the first thrust bearing on the first side of the first thrust disk, the second flowline fluidly coupled to the second thrust bearing on the third side of the second thrust disk.

The dual thrust bearing system of any preceding clause, further including a pressure control valve coupled to the first and second flowlines, and a control system to at least detect, using a load cell, a thrust load acting on the shaft in a first direction, increase, using the pressure control valve, a first pressure in the first flowline when the thrust load satisfies an upper threshold, and increase, using the pressure control valve, a second pressure in the second flowline when the thrust load does not satisfy a lower threshold.

The dual thrust bearing system of any preceding clause, wherein the first thrust bearing includes a first bearing housing surrounding the first thrust disk, the first bearing housing including a first wall facing the first side and a second wall facing the second side, a first thrust pad coupled to the first side of the first thrust disk, the first thrust pad having a first inner diameter and a first outer diameter, and a second thrust pad coupled to the first wall of the first bearing housing, the second thrust pad having a second inner diameter and a second outer diameter, the second outer diameter smaller than the first inner diameter.

The dual thrust bearing system of any preceding clause, wherein the first flowline splits into a third flowline and a fourth flowline to transmit a working fluid axially to the first side of the first thrust disk, the third flowline having a first outlet positioned adjacent to the first thrust pad, the fourth flowline having a second outlet positioned radially between the first and second thrust pads.

The dual thrust bearing system of any preceding clause, wherein the pressure control valve is a first pressure control valve, further including a second pressure control valve fluidly coupled to the fourth flowline.

The dual thrust bearing system of any preceding clause, wherein the control system is to increase, using the second pressure control valve, a pressure in the fourth flowline when the thrust load satisfies the upper threshold, and decrease, using the second pressure control valve, the pressure in the fourth flowline when the thrust load does not satisfy the lower threshold.

The dual thrust bearing system of any preceding clause, wherein the second thrust bearing includes a second bearing housing surrounding the second thrust disk, the second bearing housing including a third wall facing the third side and a fourth wall facing the fourth side, a third thrust pad coupled to the third side of the second thrust disk, the third thrust pad having a third inner diameter and a third outer diameter, and a fourth thrust pad coupled to the fourth wall of the second bearing housing, the fourth thrust pad having a fourth inner diameter and a fourth outer diameter, the fourth outer diameter smaller than the third inner diameter.

The dual thrust bearing system of any preceding clause, wherein the second flowline splits into a fifth flowline and a sixth flowline to transmit the working fluid axially to the third side of the second thrust disk, the fifth flowline including a third outlet adjacent to the third thrust pad, the sixth flowline including a fourth outlet radially between the third and fourth thrust pads.

The dual thrust bearing system of any preceding clause, wherein the third flowline, the fourth flowline, the fifth flowline, and the sixth flowline are inclined relative to the shaft.

The dual thrust bearing system of any preceding clause, wherein the pressure control valve is a first pressure control valve, further including a third pressure control valve coupled to the sixth flowline.

The dual thrust bearing system of any preceding clause, wherein the control system is to decrease, using the third pressure control valve, a pressure in the sixth flowline when the thrust load satisfies the upper threshold, and increase, using the third pressure control valve, the pressure in the sixth flowline when the thrust load does not satisfy the lower threshold.

A method comprising detecting, using a load cell, a first thrust load acting on a shaft of a pump in a first direction, determining whether the first thrust load satisfies an upper threshold, increasing, using a pressure control valve, a first fluid pressure in a first flowline when the first thrust load satisfies the upper threshold, the first flowline fluidly coupled to a compressor collector of the pump and a first thrust bearing, the first thrust bearing configured to support the first thrust load, determining whether the first thrust load satisfies a lower threshold, and increasing, using the pressure control valve, a second fluid pressure in a second flowline when the first thrust load does not satisfy the lower threshold, the second flowline fluidly coupled to the compressor collector of the pump and a second thrust bearing, the second thrust bearing configured to support a second thrust load acting on the shaft in a second direction opposite the first direction.

The method of any preceding clause, wherein the first thrust bearing includes a first side and a second side opposite the first side, and the second thrust bearing includes a third side and a fourth side opposite the third side, the first flowline fluidly coupled to the first side, the second flowline fluidly coupled to the third side.

The method of any preceding clause, wherein the first direction corresponds to an aft direction of the pump, and the second direction corresponds to a forward direction of the pump, the first thrust bearing positioned forward of the second thrust bearing.

The method of any preceding clause, wherein the first direction corresponds to a forward direction of the pump, and the second direction corresponds to an aft direction of the pump, the second thrust bearing positioned forward of the first thrust bearing.

A non-transitory machine readable storage medium comprising instructions that, when executed, cause processor circuitry to at least detect, using a load cell, a first thrust load acting on a shaft of a pump in a first direction, determine whether the first thrust load satisfies an upper threshold, increase, using a pressure control valve, a first fluid pressure in a first flowline when the first thrust load satisfies the upper threshold, the first flowline fluidly coupled to a compressor collector of the pump and a first thrust bearing, the first thrust bearing configured to support the first thrust load, determine whether the first thrust load satisfies a lower threshold, and increase, using the pressure control valve, a second fluid pressure in a second flowline when the first thrust load does not satisfy a lower threshold, the second flowline fluidly coupled to the compressor collector of the pump and a second thrust bearing, the second thrust bearing configured to support a second thrust load acting on the shaft in a second direction opposite the first direction.

The non-transitory machine readable storage medium of any preceding clause, wherein the first thrust bearing includes a first side and a second side opposite the first side, and the second thrust bearing includes a third side and a fourth side opposite the third side, the first flowline fluidly coupled to the first side, the second flowline fluidly coupled to the third side.

The non-transitory machine readable storage medium of any preceding clause, wherein the first direction corresponds to an aft direction of the pump, and the second direction corresponds to a forward direction of the pump, the first thrust bearing positioned forward of the second thrust bearing.

The non-transitory machine readable storage medium of any preceding clause, wherein the first direction corresponds to a forward direction of the pump, and the second direction corresponds to an aft direction of the pump, the second thrust bearing positioned forward of the first thrust bearing.

An apparatus comprising means for supporting aft thrust on a shaft of a thermal transport bus pump, means for supporting forward thrust on the shaft, means for transmitting a working fluid from a compressor collector of the thermal transport bus pump to the aft thrust supporting means and the forward thrust supporting means, means for adjusting a first pressure in the aft thrust supporting means and a second pressure in the forward thrust supporting means, and means for controlling the adjusting means, the controlling means to at least detect, using means for measuring thrust loads, an aft thrust or a forward thrust acting on the shaft, increase, using the adjusting means, the first pressure in the aft thrust supporting means when (i) the aft thrust satisfies an upper threshold or (ii) when the forward thrust does not satisfy a lower threshold, and increase, using the adjusting means, the second pressure in the forward thrust supporting means when (i) the forward thrust satisfies the upper threshold or (ii) when the aft thrust does not satisfy the lower threshold.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A thrust bearing apparatus to support thrust loading on a shaft of a pump, the thrust bearing apparatus comprising:
    a thrust disk extending radially from the shaft, the thrust disk having a first side and a second side opposite the first side;
    a bearing housing surrounding the thrust disk and the shaft, the thrust disk disposed within the bearing housing, the bearing housing having a first wall facing the first side of the thrust disk and a second wall facing the second side of the thrust disk;
    a first thrust pad coupled to the first wall of the bearing housing, the first thrust pad including a first plurality of serrations circumferentially arranged in a first pattern along the first thrust pad; and
    a second thrust pad coupled to the first side of the thrust disk, the second thrust pad including a second plurality of serrations circumferentially arranged in a second pattern along the second thrust pad.

2. The thrust bearing apparatus of claim 1, wherein the first thrust pad has a first inner diameter and a first outer diameter, and the second thrust pad has a second inner diameter and a second outer diameter.

3. The thrust bearing apparatus of claim 2, wherein the first outer diameter is less than the second inner diameter.

4. The thrust bearing apparatus of claim 1, wherein the first wall includes a first inner radial portion and a first outer radial portion, the first thrust pad positioned on the first inner radial portion.

5. The thrust bearing apparatus of claim 4, wherein the thrust disk includes a second inner radial portion and a second outer radial portion, the second thrust pad positioned on the second outer radial portion, the first thrust pad to not overlap the second thrust pad.

6. The thrust bearing apparatus of claim 1, wherein the first pattern and the second pattern include a plurality of U-shaped serrations having a rounded end and a pair of arms.

7. The thrust bearing apparatus of claim 1, wherein at least one of the first pattern or the second pattern include a fan of serrations that spiral outward from an inner circumference of at least one of the first thrust pad or the second thrust pad.

8. The thrust bearing apparatus of claim 1, wherein at least one of the first pattern or the second pattern include a sequence of two arrow-shaped serrations and one through hole consecutively repeated along at least one of the first thrust pad or the second thrust pad.

9. The thrust bearing apparatus of claim 1, wherein at least one of the first pattern or the second pattern include a sequence of two bow-shaped serrations and one through hole consecutively repeated along at least one of the first thrust pad or the second thrust pad.

10. A pump including:
a shaft; and
a thrust bearing apparatus to support thrust loading on the shaft, the thrust bearing apparatus including:
 a thrust disk extending radially from the shaft, the thrust disk having a first side and a second side opposite the first side;
 a bearing housing surrounding the thrust disk and the shaft, the thrust disk disposed within the bearing housing, the bearing housing having a first wall facing the first side of the thrust disk and a second wall facing the second side of the thrust disk;
 a first thrust pad coupled to the first wall of the bearing housing, the first thrust pad including a first plurality of serrations circumferentially arranged in a first pattern along the first thrust pad; and
 a second thrust pad coupled to the first side of the thrust disk, the second thrust pad including a second plurality of serrations circumferentially arranged in a second pattern along the second thrust pad.

11. The pump of claim 10, wherein the first thrust pad has a first inner diameter and a first outer diameter, and the second thrust pad has a second inner diameter and a second outer diameter.

12. The pump of claim 11, wherein the first outer diameter is less than the second inner diameter.

13. The pump of claim 10, wherein the first wall includes a first inner radial portion and a first outer radial portion, the first thrust pad positioned on the first inner radial portion.

14. The pump of claim 13, wherein the thrust disk includes a second inner radial portion and a second outer radial portion, the second thrust pad positioned on the second outer radial portion, the first thrust pad to not overlap the second thrust pad.

15. The pump of claim 10, wherein the first pattern and the second pattern include a plurality of U-shaped serrations having a rounded end and a pair of arms.

16. The pump of claim 10, wherein at least one of the first pattern or the second pattern include a fan of serrations that spiral outward from an inner circumference of at least one of the first thrust pad or the second thrust pad.

17. The pump of claim 10, wherein at least one of the first pattern or the second pattern include a sequence of two arrow-shaped serrations and one through hole consecutively repeated along at least one of the first thrust pad or the second thrust pad.

18. The pump of claim 10, wherein at least one of the first pattern or the second pattern include a sequence of two bow-shaped serrations and one through hole consecutively repeated along at least one of the first thrust pad or the second thrust pad.

* * * * *